US011860022B2

(12) United States Patent
Bellina et al.

(10) Patent No.: US 11,860,022 B2
(45) Date of Patent: Jan. 2, 2024

(54) CAPACITIVE SENSING UTILIZING A DIFFERENTIAL VALUE INDICATION

(71) Applicant: Microchip Technology Incorporated, Chandler, AZ (US)

(72) Inventors: Lorenzo Bellina, Belluno (IT); Maurizio Fiammeni, Monza Brianza (IT)

(73) Assignee: Microchip Technology, Inc., Chandler, AZ (US)

( * ) Notice: Subject to any disclaimer, the term of this patent is extended or adjusted under 35 U.S.C. 154(b) by 104 days.

(21) Appl. No.: 17/336,068

(22) Filed: Jun. 1, 2021

(65) Prior Publication Data

US 2021/0372842 A1    Dec. 2, 2021

Related U.S. Application Data

(60) Provisional application No. 62/704,895, filed on Jun. 2, 2020.

(51) Int. Cl.
*G01F 23/26* (2022.01)
*G01F 23/263* (2022.01)
*G01D 5/24* (2006.01)

(52) U.S. Cl.
CPC ......... *G01F 23/263* (2013.01); *G01D 5/2405* (2013.01)

(58) Field of Classification Search
CPC .... G01F 23/263; G01F 23/266; G01D 5/2405
See application file for complete search history.

(56) References Cited

U.S. PATENT DOCUMENTS

| 5,854,881 A | 12/1998 | Yoshida et al. |
| 6,075,520 A | 6/2000 | Inoue et al. |

(Continued)

FOREIGN PATENT DOCUMENTS

| CN | 210603488 U | 5/2020 | |
| CN | 111999572 A * | 11/2020 | ............. G01D 21/02 |

(Continued)

OTHER PUBLICATIONS

Texas Instruments, "FDC1004 4-Channel Capacitance-to-Digital Converter for Capacitive Sensing Solutions", Product Guide for FDC 1004, SNOSCY5B, Aug. 2014—Revised Apr. 2015, 35 pages.

(Continued)

*Primary Examiner* — Francis C Gray
(74) *Attorney, Agent, or Firm* — TraskBritt

(57) ABSTRACT

One or more examples relate to a detector. A signal that the detector is configured to sense is a differential value. Such a differential value may be indicative of a difference in self-capacitance indications that are exhibited at first and second internal capacitors. Such a differential value may be proportional to a relationship between a first material and a second material present at a device-under-test coupled to electrodes of the detector. Such a differential value may be proportional to a vertical elevation of a surface of a material present at a device-under-test coupled to electrodes of the detector. A difference in coupling capacitances may be obtained by performing complimentary acquisition processes utilizing symmetric capacitive sensors. When the acquisition processes are performed substantially simultaneously, coupling error indications that may be present in the self-capacitance indications are not present in the differential value.

19 Claims, 12 Drawing Sheets

(56) References Cited

U.S. PATENT DOCUMENTS

| | | | |
|---|---|---|---|
| 7,663,607 B2 | 2/2010 | Hotelling et al. | |
| 7,875,814 B2 | 1/2011 | Chen et al. | |
| 7,920,129 B2 | 4/2011 | Hotelling et al. | |
| 8,031,094 B2 | 10/2011 | Hotelling et al. | |
| 8,031,174 B2 | 10/2011 | Hamblin et al. | |
| 8,040,326 B2 | 10/2011 | Hotelling et al. | |
| 8,049,732 B2 | 11/2011 | Hotelling et al. | |
| 8,179,381 B2 | 5/2012 | Frey et al. | |
| 8,570,289 B2 | 10/2013 | Chang et al. | |
| 8,994,692 B2 | 3/2015 | Yumoto et al. | |
| 9,013,444 B2 | 4/2015 | Hanssen et al. | |
| 9,110,544 B2 | 8/2015 | Chang et al. | |
| 9,285,902 B1 | 3/2016 | Kremin et al. | |
| 9,501,180 B2 | 11/2016 | Hung et al. | |
| 10,969,262 B1* | 4/2021 | Zhang | G01F 23/268 |
| 11,333,542 B2* | 5/2022 | Yonemura | B01L 3/0268 |
| 2003/0080755 A1 | 5/2003 | Kobayashi | |
| 2005/0122785 A1 | 6/2005 | Umeda et al. | |
| 2006/0227119 A1 | 10/2006 | Hsieh et al. | |
| 2006/0250142 A1 | 11/2006 | Abe | |
| 2007/0076171 A1 | 4/2007 | Fasen et al. | |
| 2008/0231290 A1 | 9/2008 | Zhitomirsky | |
| 2008/0252474 A1 | 10/2008 | Nakamura et al. | |
| 2009/0212642 A1 | 8/2009 | Krah | |
| 2009/0315854 A1 | 12/2009 | Matsuo | |
| 2010/0045310 A1 | 2/2010 | Betancourt | |
| 2010/0181180 A1 | 7/2010 | Peter | |
| 2010/0315102 A1 | 12/2010 | Portmann | |
| 2011/0037708 A1 | 2/2011 | Yang et al. | |
| 2011/0048812 A1 | 3/2011 | Yilmaz | |
| 2011/0084929 A1 | 4/2011 | Chang et al. | |
| 2011/0090212 A1 | 4/2011 | Han et al. | |
| 2011/0163994 A1 | 7/2011 | Tang et al. | |
| 2012/0038573 A1 | 2/2012 | Kuang et al. | |
| 2012/0050211 A1 | 3/2012 | King et al. | |
| 2012/0120006 A1 | 5/2012 | Yong | |
| 2012/0133594 A1 | 5/2012 | Edwards et al. | |
| 2012/0169631 A1 | 7/2012 | Ahn | |
| 2012/0242588 A1 | 9/2012 | Myers et al. | |
| 2012/0242592 A1 | 9/2012 | Rothkopf et al. | |
| 2012/0243151 A1 | 9/2012 | Lynch | |
| 2012/0243719 A1 | 9/2012 | Franklin et al. | |
| 2012/0299869 A1 | 11/2012 | Hung et al. | |
| 2012/0306802 A1* | 12/2012 | McCracken | G06F 3/04166 345/174 |
| 2012/0327026 A1 | 12/2012 | Lee et al. | |
| 2013/0082763 A1 | 4/2013 | Inada et al. | |
| 2013/0093720 A1 | 4/2013 | Liu et al. | |
| 2013/0257785 A1 | 10/2013 | Brown et al. | |
| 2013/0278538 A1 | 10/2013 | Brunet et al. | |
| 2013/0314109 A1 | 11/2013 | Kremin et al. | |
| 2014/0043279 A1 | 2/2014 | Pedersen et al. | |
| 2014/0104261 A1 | 4/2014 | Cheng et al. | |
| 2014/0152621 A1 | 6/2014 | Okayama et al. | |
| 2014/0168159 A1 | 6/2014 | Li et al. | |
| 2014/0210764 A1 | 7/2014 | Shepelev | |
| 2014/0253491 A1 | 9/2014 | Kwon et al. | |
| 2014/0306924 A1 | 10/2014 | Lin et al. | |
| 2015/0301646 A1 | 10/2015 | Caldwell et al. | |
| 2016/0003663 A1 | 1/2016 | Miatton et al. | |
| 2018/0004349 A1 | 1/2018 | Gicquel et al. | |
| 2020/0333175 A1* | 10/2020 | Huang | G01R 27/2635 |
| 2021/0096016 A1* | 4/2021 | Yonemura | G01F 23/266 |

FOREIGN PATENT DOCUMENTS

| | | | | |
|---|---|---|---|---|
| DE | 102012020925 A1 | 4/2014 | | |
| EP | 1961575 A2 * | 8/2008 | | B41J 2/17509 |
| EP | 1961575 A2 | 8/2008 | | |
| WO | 2012/129247 A2 | 9/2012 | | |

OTHER PUBLICATIONS

Microchip, Capacitive Touch Using Only and ADC ("CVD"), Product Guide for AN 1298, 2009, 4 pages.

Microchip, "mTouch Sensing Solution Acquisition Methods Capacitive Voltage Divider", Product Guide for AN1478, 2012, 28 pages.

U.S. Appl. No. 62/704,895, filed Jun. 2, 2020, titled "Capacitive Liquid Level Sensor Using True Simultaneous Differential Acquisition in Push Pull Mode", to Bellina et al., 19 pages.

U.S. Provisional Application filed Mar. 21, 2011 by Lynch, U.S. Appl. No. 61/454,950.

U.S. Provisional Application filed Mar. 21, 2011 by Myers, U.S. Appl. No. 61/454,936.

U.S. Provisional Application filed Mar. 21, 2011 by Rothkopf, U.S. Appl. No. 61/454,894.

International Search Report from International Application No. PCT/US2021/035283, dated Sep. 16, 2021, 5 pages.

International Written Opinion from International Application No. PCT/US2021/035283, dated Sep. 16, 2021, 10 pages.

\* cited by examiner

CAPACITIVE SENSING UTILIZING A DIFFERENTIAL VALUE INDICATION

CROSS-REFERENCE TO RELATED APPLICATIONS

This application claims the benefit under 35 U.S.C. § 119(e) of U.S. Provisional Patent Application Ser. No. 62/704,895, filed Jun. 2, 2020, the disclosure of which is hereby incorporated herein in its entirety by this reference.

FIELD

One or more examples relate, generally, to capacitive sensing. One or more examples relate, generally, to capacitive distance sensing, and material level sensing. One or more examples relate, generally, to acquiring a differential value that is an indication of a component of a self-capacitance.

BACKGROUND

Capacitive sensors are used in a variety of operational contexts, for example, for capacitive proximity sensing and distance sensing, without limitation.

BRIEF DESCRIPTION

To easily identify the discussion of any particular element or act, the most significant digit or digits in a reference number refer to the figure number in which that element is first introduced.

DETAILED DESCRIPTION

Figure 1A:
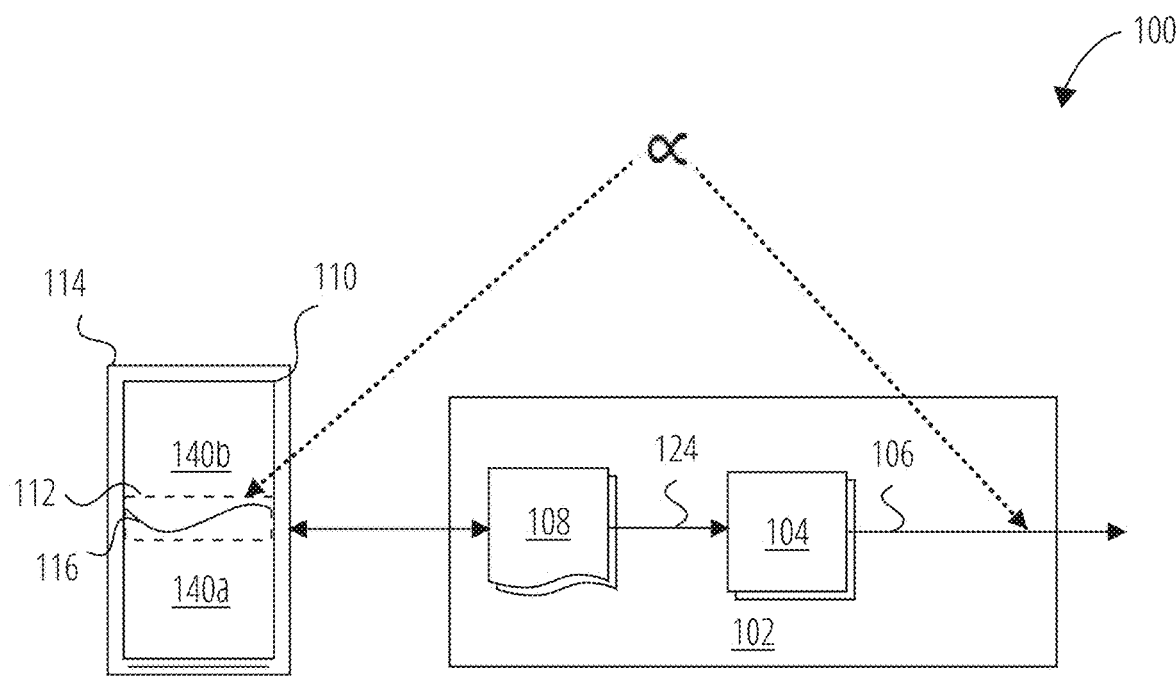
FIG. 1A is a block diagram depicting a capacitive sensing system in accordance with one or more examples.

In the following detailed description, reference is made to the accompanying drawings, which form a part hereof, and in which are shown, by way of illustration, specific examples in which the present disclosure may be practiced. These examples are described in sufficient detail to enable a person of ordinary skill in the art to practice the present disclosure. However, other examples enabled herein may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. In some instances, similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example nor this disclosure to the specified components, steps, features, functions, or the like.

It will be readily understood that the components of the examples as generally described herein and illustrated in the drawings could be arranged and designed in a wide variety of different configurations. Thus, the following description of various examples is not intended to limit the scope of the present disclosure, but is merely representative of various examples. While the various aspects of the examples may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein.

Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the examples disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein—all of which are encompassed by use of the term "processor." A general-purpose processor may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code, without limitation) related to examples of the present disclosure.

Examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term "substantially" or "about" in reference to a given parameter, property, or condition means and includes to a degree that one of ordinary skill in the art would understand that the given parameter, property, or condition is met with a small degree of variance, such as within acceptable manufacturing or operating tolerances. By way of example, depending on the particular parameter, property, or condition that is substantially met, the parameter, property, or condition may be at least 90% met, at least 95% met, or even at least 99% met.

As used herein, any relational term, such as "over," "above," "under," "on," "underlying," "upper," or "lower," without limitation, is used for clarity and convenience in understanding the disclosure and accompanying drawings and does not connote or depend on any specific preference, orientation, or order, except where the context clearly indicates otherwise.

In this description the term "coupled" and derivatives thereof may be used to indicate that two elements co-operate or interact with each other. When an element is described as being "coupled" to another element, then the elements may be in direct physical or electrical contact or there may be intervening elements or layers present. In contrast, when an element is described as being "directly coupled" to another element, then there are no intervening elements or layers present. The term "connected" may be used in this description interchangeably with the term "coupled," and has the same meaning as "coupled" unless expressly indicated otherwise or the context would indicate otherwise to a person having ordinary skill in the art. It will be understood that when an element is referred to as "connecting" or "coupling" a first element and a second element then it is coupled to the first element and it is coupled to the second element.

When an element is referred to herein as being "electrically coupled" to another element, then one or more of charge or signals can be transferred between the element and the other element, directly or via intervening elements if any are present. It will be understood that when an element is referred to as "electrically connecting" or "electrically coupling" a first element and a second element, then one or more of charge or signals can be transferred between the first element and the second element via the element, directly or via intervening elements if any are present.

Self-capacitance is a capacitance of an electrode to a virtual ground, and such virtual ground may or may not be known.

When the self-capacitance of an electrode is measured, it is typically with respect to a signal that has a local ground as a reference potential, and the signal serves as an indication of the self-capacitance or a magnitude of a variation therein. There may be variations in a coupling between an electrode and a virtual ground, which affects self-capacitance and indications of the self-capacitance of the electrode, and such variations may or may not be known. As a non-limiting example, if an electrode is coupled to a material-of-interest, there may be electrical coupling of the material-of-interest to an Earth potential or a local ground of a capacitive sensor due to an environment factors (e.g., objects that touch a material or a device-under-test in which the material is present, without limitation), which may affect the self-capacitance, and indications of self-capacitance, of an electrode. Moreover, electrical noise can reduce the accuracy and resolution of a signal and a value generated to represent the signal. If, as a non-limiting example, the signal or value representative thereof is being used to infer information about a material-of-interest then the presence in the signal/value of effects of the noise and variations due to something other than changes at the material reduces the degree of correlation between the signal and the material-of-interest and the information about the material-of-interest being inferred from the signal/value. The presence of such affects is referred to herein as "coupling errors."

In applications that utilize self-capacitance indications to infer information about a material-of-interest, such as material level sensing (e.g., a level of a liquid, solution, or mixture in a vessel, without limitation), coupling errors may have undesirable, and even catastrophic, effects on a system or process that utilizes such information. Further, the inventors of this disclosure appreciate that it is often difficult to run-time compensate for coupling errors without worsening a coupling error. Further, a magnitude of a coupling error depends on many factors such as a power supply topology of a capacitive sensor (e.g., isolated or non-isolated, switching, linear, battery powered supply, without limitation), coupling variations due to run-time change of other application loads, and run time change of the material coupling to earth (e.g., such as a human hand coupling, without limitation), without limitation, and it is difficult to predict and address all of them in advance.

In coupling error sensitive applications, sometimes an attempt is made to increase a degree of controlled capacitive coupling of a material to a ground of a circuit of a capacitive sensor in order to reduce the influence of variations between the material-of-interest and Earth. The inventors of this disclosure appreciate that, in practice, it is challenging to fully realize the benefits of such an approach due to mechanical, electrical, or cost constraints. Sometimes an attempt is made to couple a material-of-interest to ground, however, the inventors of this disclosure appreciate that this implies other constraints such as electrical insulation, introducing a foreign metal body (conductor for a ground path) into a material that may corrode, and regulatory constraints such as health concerns in the case of food and beverage applications.

The inventors of this disclosure appreciate that a solution that natively reduces coupling error, as a non-limiting example without some or all of the disadvantages discussed above, would be desirable.

The inventors of this disclosure appreciate that in the case of variations in self-capacitance of an electrode, the variations may be due to variations in a material-of-interest, the variations may be due to variations between a material-of-interest/circuit of a capacitive sensor and Earth potential, and components of the variations may be separately due to both variations in the material-of-interest and variations between the material-of-interest/circuit of a capacitive sensor and Earth potential. The inventors of this disclosure appreciate that it would be desirable to observe or capture the component of variation in self-capacitance that is due to variations in the material-of-interest independent of variations between the material-of-interest/circuit of a capacitive sensor and Earth potential.

As used herein, "coupling capacitance" means a component of a self-capacitance of an electrode that corresponds to capacitive coupling to a local reference potential of the electrode.

FIG. 1A is a block diagram depicting a capacitive sensing system 100, in accordance with one or more examples. Capacitive sensing system 100 is configured, generally, to generate a differential value 106 that is proportional to a property 112 of a material 110 present at a device-under-test 114 (DUT 114). Property 112 of material 110 may change, and differential value 106 may reflect changes in property 112. In one or more examples, property 112 of material 110 may be at least partially based on a relationship 116 between first material 140a and second material 140b of material 110. Relationship 116 between first material 140a and second material 140b of material 110 may change, and property 112 of material 110 may reflect changes in relationship 116. In this manner, property 112 is an indication of relationship 116 between first material 140a and second material 140b.

In one or more examples, values for property 112, relationship 116, and measures of first material 140a, second material 140b, or DUT 114 that are directly proportional thereto may be inferred at least partially based on respective coupling capacitances (Cs) of electrodes 108 of detector 102. Detector 102 is configured, generally, to generate a differential value 106 that is an indication of respective coupling capacitances of electrodes 108, including when coupled to DUT 114. Detector 102 may generate signals at first and second internal capacitors 104, respectively, that are self-capacitance indications 124 of electrodes 108 of detector 102. Detector 102 may generate differential value 106 by calculating a difference between self-capacitance indications 124, as discussed herein.

Detector 102 may generate the signals and values for self-capacitance indications 124 by performing specific processes that are susceptible to coupling errors. Self-capacitance indications 124 include coupling capacitance indications. Self-capacitance indications 124 may additionally include coupling error indications. As discussed above, the presence of coupling error indications may affect a degree of correspondence of self-capacitance indications 124 to coupling capacitances of electrodes 108. By taking the difference between the respective self-capacitance indications 124 of electrodes 108, detector 102 generates a value, i.e., differential value 106, that is indicative of coupling capacitance of electrodes 108. More specifically, detector 102 is configured to generate self-capacitance indications 124 in such a way that coupling error indications present in respective self-capacitance indications 124 are individually cancellable. Coupling capacitance indications present in respective self-capacitance indications 124 are preserved in differential value 106.

Figure 1B:
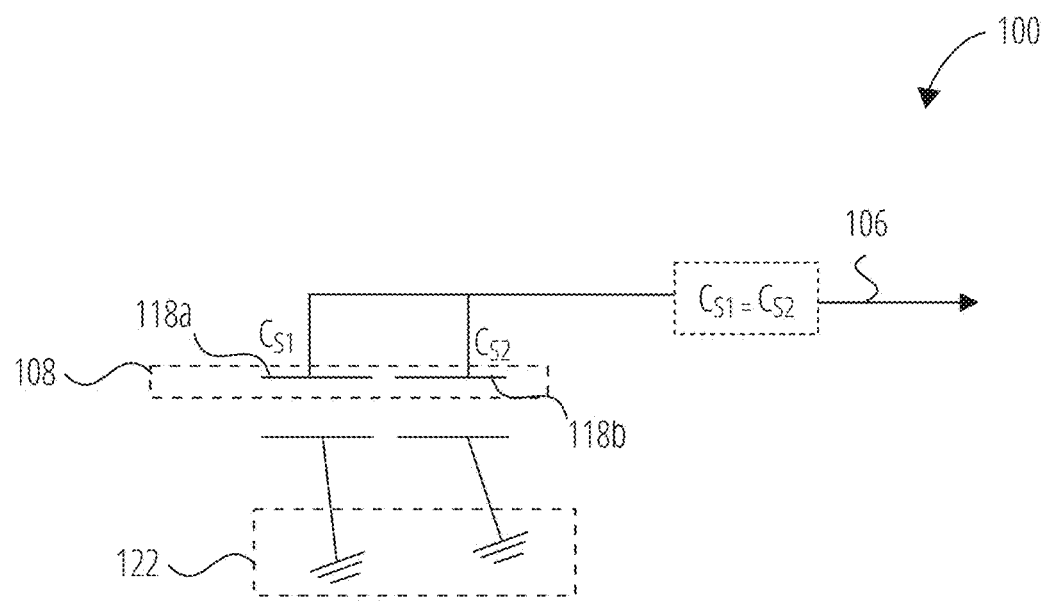
FIG. 1B is a block diagram depicting a capacitive sensing system in accordance with one or more examples.

FIG. 1B is a block diagram depicting capacitive sensing system 100. Electrodes 108 have, as at least a component of their respective self-capacitances, coupling capacitances $C_{S1}$ and $C_{S2}$ associated with respective electrodes 118a and 118b, respectively, of electrodes 108. Coupling capacitances $C_{S1}$ and $C_{S2}$ are substantially the same. Differential value 106 is an indication of coupling capacitances $C_{S1}$ and $C_{S2}$ and, accordingly, is an indication of respective coupling capacitances of electrodes 118a and 118b of electrodes 108. Coupling capacitances $C_{S1}$ and $C_{S2}$ may also be characterized as a component of self-capacitance of respective electrodes 118a and 118b of electrodes 108 associated with coupling between respective electrodes 118a and 118b of electrodes 108 and reference potential 122. Further, coupling variations between respective electrodes 118a and 118b and reference potential 122 are reflected in variations in coupling capacitances $C_{S1}$ and $C_{S2}$ and magnitudes of differential value 106.

In one or more examples, various inferences may be reliably made at least partially based on differential value 106. Non-limiting examples of inferences include, respective amounts or levels of materials 140a or 140b or an amount of utilization of DUT 114 (e.g., utilized capacity, remaining capacity, without limitation).

Figure 1C:
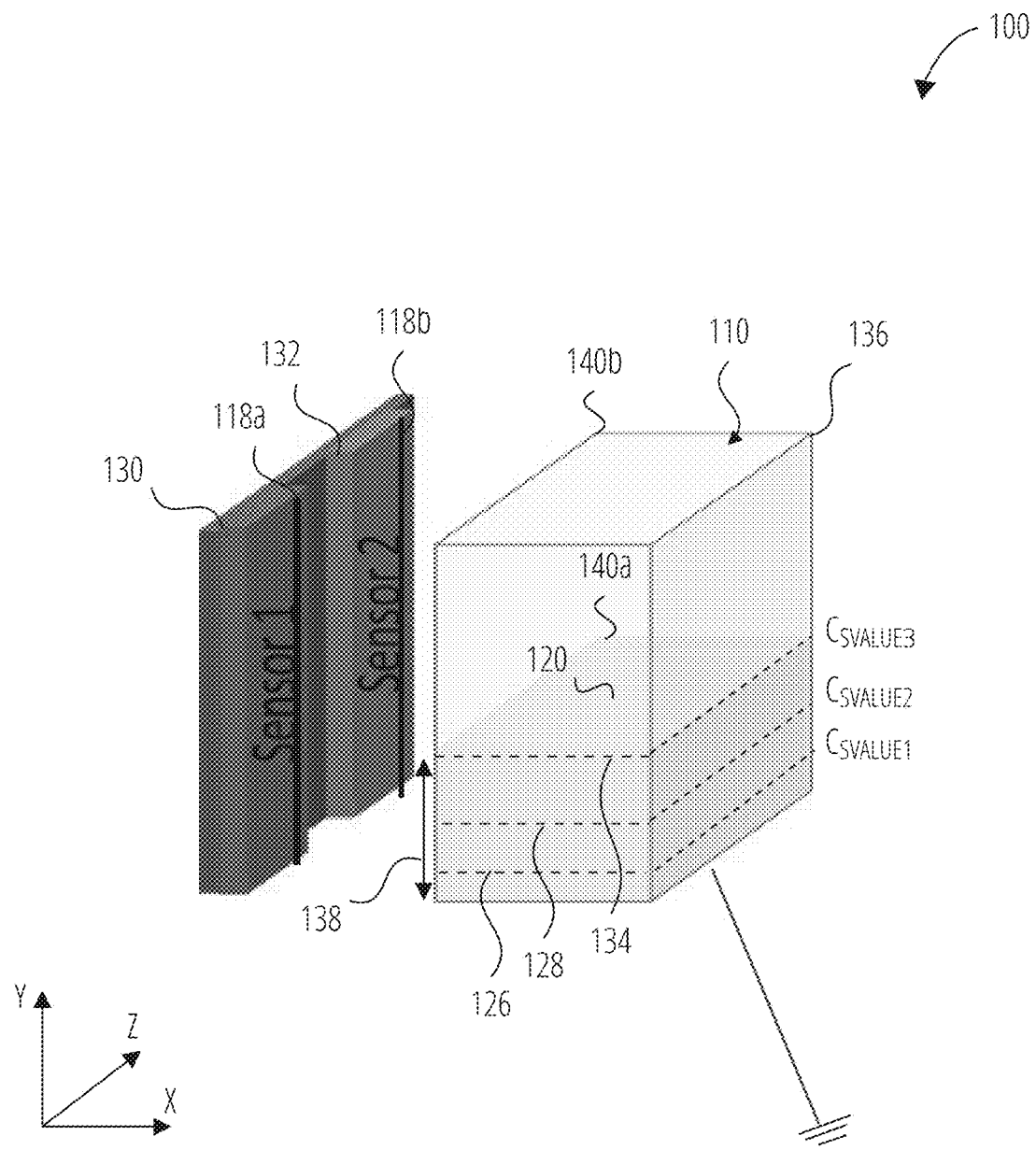
FIG. 1C is a block diagram depicting a capacitive sensing system in accordance with one or more examples.

FIG. 1C is a diagram depicting capacitive sensing system 100. First sensor 130 and second sensor 132 arranged adjacent a volume 136 (e.g., defined by DUT 114 of FIG. 1). Respective lengths of respective electrodes 118a and 118b of first and second sensors 130 and 132 extend continuously in a first vertical direction (e.g., extend in the Y-direction as depicted by FIG. 1C, without limitation). A first vertical direction may extend substantially in parallel to a vertically-orientated boundary-plane of volume 136. Volume 136 represents a volume of space occupied by material 110 (reference label "110" points to the entire contents of volume 136). Material 110 includes first material 140a (e.g., a liquid, without limitation) and second material 140b (e.g., air, without limitation), which are different. In various examples, material 110 may have a non-homogenous state or a homogenous state. As a non-limiting example of a non-homogenous state, non-zero amounts of first material 140a and second material 140b may be present in material 110 (e.g., a DUT 114 has some liquid in it, but is not full, and the rest of the volume has air in it, without limitation). As a non-limiting example of a homogenous state, one or the other of first material 140a or second material 140b are present (e.g., a DUT 114 is "full" of either first material 140a or second material 140b, without limitation).

Coupling capacitance of electrodes 118a and 118b may change proportionally to changes in a property 112 that is a dielectric property of material 110. Non-limiting examples of dielectric properties include dielectric geometry (e.g., thickness or width of material 110, without limitation) and dielectric material characteristics (i.e., a characterization of energy absorption from an electric field). A dielectric property of material 110 may be at least partially based on the respective dielectric properties of first material 140a and second material 140b, and so at least partially based on a ratio of respective amounts of first material 140a and second material 140b present in volume 136. A ratio of respective amounts of first material 140a and second material 140b may change. A dielectric property of material 110 may change in response to a change in a ratio of respective amounts of first material 140a and second material 140b present in volume 136. In one or more examples, respective coupling capacitances of electrodes 118a and 118b may be an indication of a relationship 116 (FIG. 1A) in which the relationship 116 is a ratio of respective amounts of first material 140a and second material 140b. A ratio of respective amounts of first material 140a and second material 140b may be an indication of a level or vertical elevation of first material 140a or second material 140b. A vertical elevation of surface 120 of first material 140a may change (e.g., rise or fall, without limitation). As a non-limiting example, various amounts of first material 140a may be added or removed from volume 136, and similar amounts (in terms of volume) of second material 140b removed or added. In one or more examples, surface 120 may be substantially planar or lumpy, substantially parallel or angled with respect to a surface on which a volume 136 is set.

Values of coupling capacitance ($C_{s1}$, $C_{s2}$, where $C_{s1}=C_{s2}$) of electrodes 118a and 118b may change proportionally as vertical elevations of surface 120 of first material 140a change. Specific non-limiting examples of changing vertical elevations 138 of surface 120 (which may also be characterized as a "level" of first material 140a) are depicted, namely first vertical elevation 126, second vertical elevation 128, and third vertical elevation 134. Different values indicative of coupling capacitances of electrodes 118a 118b for first vertical elevation 126, second vertical elevation 128, and third vertical elevation 134 are depicted by FIG. 1C, namely, $C_{Svalue1}$, $C_{Svalue2}$, and $C_{Svalue3}$, respectively.

Figure 2:
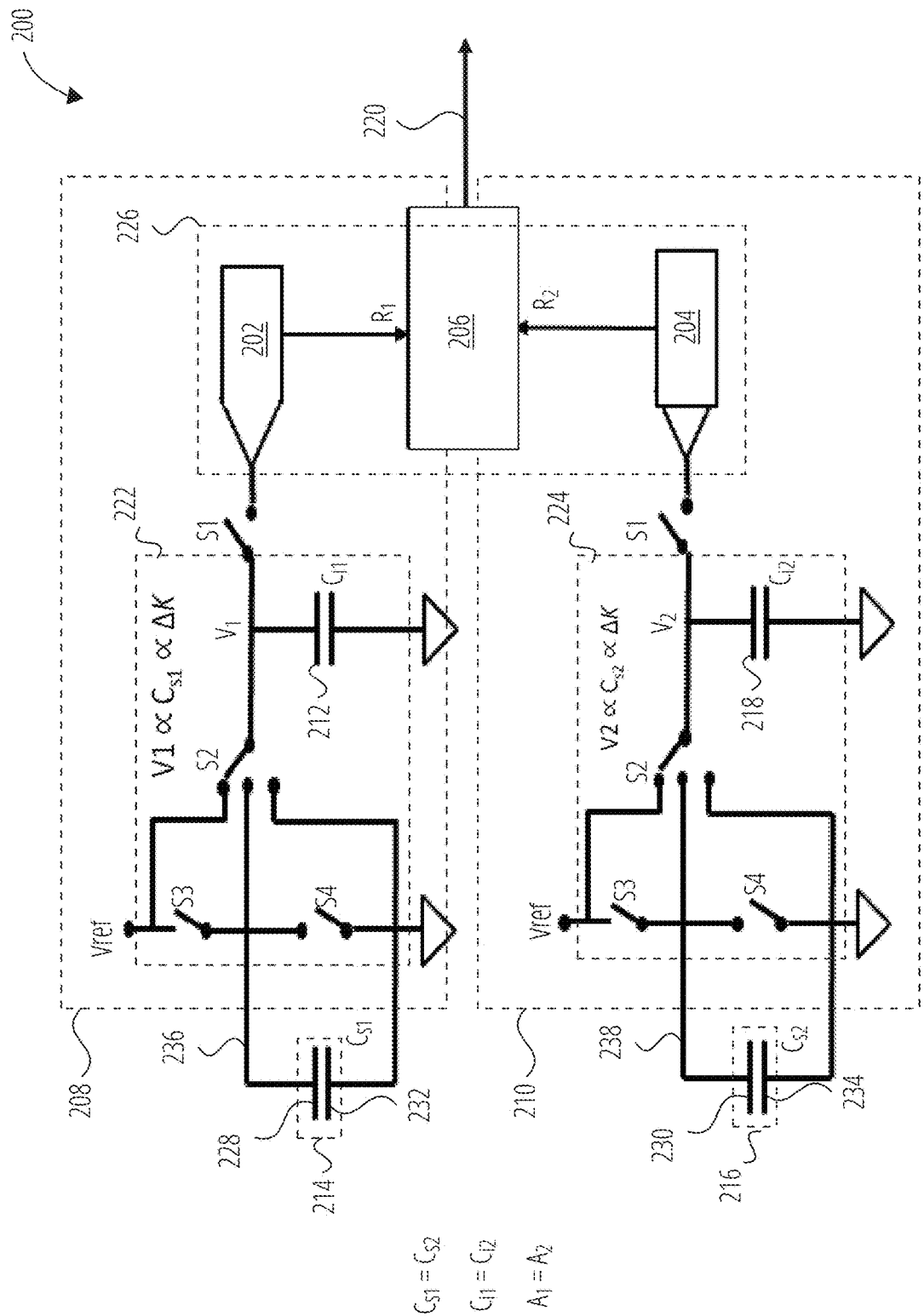
FIG. 2 is a block diagram depicting a detector in accordance with one or more examples.

FIG. 2 is a block diagram depicting a detector 200 in accordance with one or more examples. Detector 200 is configured, generally, to generate a differential value 220 that is an indication of a magnitude of the coupling capacitances $C_{s1}$ and $C_{s2}$ of respective electrodes 228 and 230 of first sensor 208 and second sensor 210, where $C_{s1}=C_{s2}$. Detector 200 is a non-limiting example of a detector 102 of FIG. 1A.

In one or more examples, first sensor 208 and second sensor 210 are symmetrical. As used herein, when capacitive sensors, such as first sensor 208 and second sensor 210, are described as "symmetrical," that means that the capacitive sensors respond to substantially the same degree to substantially the same variations in coupling capacitance of respective electrodes 228 and 230. As non-limiting examples, symmetrical capacitive sensors exhibit a substantially same degree of capacitive coupling to a material, and experience a substantially same change in degree of capacitive coupling in response to a change in a dielectric property of the material that affects a change in dielectric constant K of the material. Non-limiting examples of changes in a dielectric property include a change in dielectric geometry (e.g., a change in thickness or width, without limitation) or a change in a dielectric material characteristic (i.e., a change in a characterization of energy absorption from an electric field), as non-limiting examples, due to pressure or temperature. In one or more examples, to increase a degree of symmetry between first sensor 208 and second sensor 210, one or more of an area A1 and A2 of respective electrodes 228 and 230 (A1=A2), capacitance of internal capacitors ($C_{i1}=C_{i2}$), level of reference voltages, and level of ground are substantially the same.

Circuits of first external capacitor 214 and second external capacitor 216 depicted by FIG. 2 are equivalent circuits for representing respective coupling capacitances $C_{S1}$ and $C_{S2}$ of electrodes 228 and 230, which are respective plates of first and second external capacitors 214 and 216. Notably, in one or more examples, actual values of self-capacitance and coupling capacitances $C_{s1}$ and $C_{s2}$ may be known or unknown, as indications of self-capacitance and coupling capacitances of respective electrodes 228 and 230 of first and second external capacitors 214 and 216 are utilized as discussed herein.

In the case of each of first external capacitor 214 and second external capacitor 216, a material or liquid (not depicted) acts as a dielectric of respective first and second capacitors 214 and 216, and electrodes 228 and 230 are insulated electrodes arranged in proximity to a portion of a wall defining a holding region of a DUT (e.g., a basin, chamber, hollow, cavity, or space without limitation, at which a material is, or will be, present) act as respective plates of first and second external capacitors 214 and 216. There is no requirement that electrodes 228 or 230 be physically in contact with a wall of a DUT or a material present in a DUT, or another material that is in physical contact with the DUT or a material present therein.

While examples may appear to refer to a rigid-walled or fixed volume DUT, that is not a requirement and rigid-walled, flexible, fixed and non-fixed volume DUTs (e.g., a bag, chamber for dispensing liquid via pump, without limitation) are specifically contemplated and do not exceed the scope of this disclosure.

In one or more examples, first sensor 208 is configured to generate a first voltage V1 that is indicative of a self-capacitance of electrode 228, and second sensor 210 is configured to generate a second voltage V2 indicative of a second self-capacitance of electrode 230. In one or more examples, voltages V1 and V2 are generated by performing different, but complimentary, acquisition processes via a first acquisition circuit 222 of first sensor 208, and a second acquisition circuit 224 of second sensor 210, respectively. First acquisition circuit 222 and second acquisition circuit 224 each include multiple switches that are controlled to perform a first or a second acquisition process, as the case may be, and discussed later with reference to FIG. 4.

At least partially responsive to first acquisition circuit 222 performing the first acquisition process and second acquisition circuit 224 performing the second acquisition process, voltages V1 and V2 are generated at first internal capacitor 212 of first acquisition circuit 222, and second internal capacitor 218 of second acquisition circuit 224, respectively, exhibiting voltage levels that are indicative of self-capacitances of first external capacitor 214 and second external capacitor 216, respectively. These self-capacitances may (but do not necessarily) include coupling errors.

In one or more examples, an increase or decrease of the voltage level of first voltage V1 should reflect a respective proportional increase or decrease in indication of self-capacitance, and a decrease or increase of the voltage level of second voltage V2 should reflect a respective proportional increase or decrease in indication of second self-capacitance.

Measurement circuit 226 includes a first analog to digital converter (ADC) 202 of first sensor 208, a second ADC 204 of second sensor 210, and a processor 206. First ADC 202 and second ADC 204 are arranged to generate first and second values R1, R2, respectively corresponding to the respective voltage levels of voltages V1 and V2. Thus, first and second values R1, R2 are indicative of self-capacitances as are first and second voltages V1 and V2. In one or more examples, first internal capacitor 212 and second internal capacitor 218 may arranged and sized, respectively, so that respective voltage levels of voltages V1 and V2 are within operating ranges of first ADC 202 and second ADC 204. Processor 206 is configured, generally, to calculate a difference between the first and second values, i.e., R1-R2 and generate a differential value 220 that reflects a difference between first and second values R1, R2 and indicative of coupling capacitances $C_{S1}$, $C_{S2}$.

Either one of first sensor 208 and second sensor 210 may be operated according to the first acquisition process (e.g., first acquisition process 424 of FIG. 4, without limitation) or the second acquisition process (e.g., second acquisition process 426 of FIG. 4, without limitation) in a given execution of a measurement. In one or more examples, first sensor 208 and second sensor 210 may be operated utilizing their respective switches S1, S2, S3 and S4. As used herein, when a switch, or a connection via a switch, is described as being "ON" that means current flows through the switch or connection, and when a switch is described as being "OFF" that means current does not flow through the switch or connection.

Figure 3:
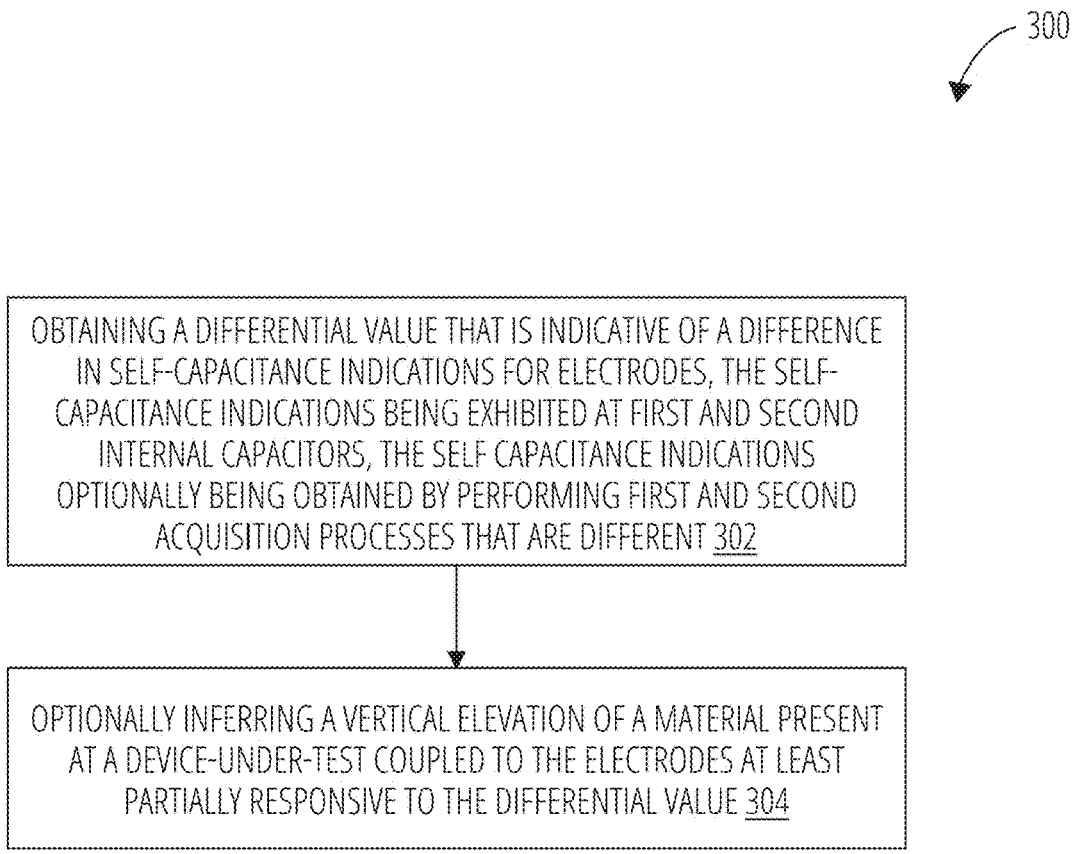
FIG. 3 is a flow diagram depicting a process for generating a differential value in accordance with one or more examples.

FIG. 3 is a flow diagram depicting a process 300 for generating a differential value that is an indication of coupling capacitance, in accordance with one or more examples.

At operation 302, process 300 obtains a differential value that is indicative of a difference in self-capacitance indications for electrodes. The self-capacitance indications may be exhibited at first and second internal capacitors. In one or more examples, the self-capacitance indications may optionally have been obtained by performing first and second acquisition processes that are different.

At operation 304, process 300 optionally infers a vertical elevation of a surface of a material present at a device-under-test coupled to the electrodes at least partially responsive to the differential value. In one or more examples, process 300 optionally infers a relationship between a first and second material present at a device-under-test and optionally infers a vertical elevation of a surface of one of the first and second materials at least partially responsive to a differential value.

Figure 4:
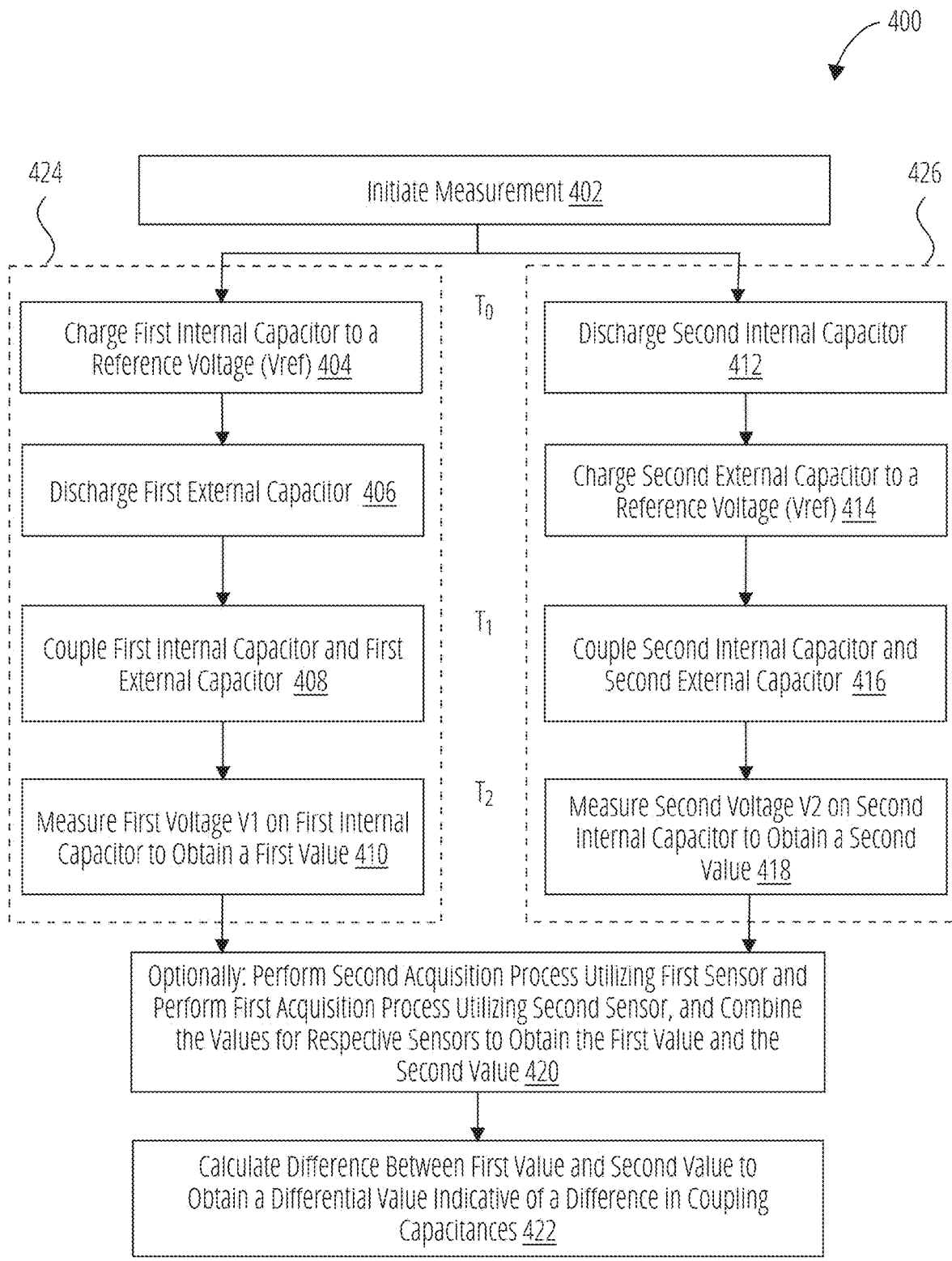
FIG. 4 is a flow diagram depicting an acquisition process, in accordance with one or more examples.

FIG. 4 is a flow diagram depicting a differential acquisition process 400 for acquiring a differential value that is indicative of coupling capacitance, in accordance with one or more examples.

Differential acquisition process 400 includes first acquisition process 424 and second acquisition process 426. First acquisition process 424 and second acquisition process 426 are non-limiting examples of the first and second acquisition processes of process 300.

In one or more examples, detector 200, or differential acquisition process 400 more generally, may be configured to operate either one of first sensor 208 and second sensor 210 according to first acquisition process 424 or second acquisition process 426 for a given execution of differential acquisition process 400. In the specific non-limiting example depicted by FIG. 4, first sensor 208 performs first acquisition process 424 and second sensor 210 performs second acquisition process 426.

In one or more examples, first acquisition processes 424 and second acquisition process 426 are performed substantially simultaneously. The following operations are performed substantially simultaneously: operation 404/operation 412, operation 406/operation 414, operation 408/operation 416, and operation 410/operation 418. As discussed below, this ensures that the sensors performing first acquisition process 424 and second acquisition process 426 are affected in the same, but opposite, ways, as discussed below.

At operation 402, differential acquisition process 400 initiates a measurement. In one or more examples, differential acquisition process 400 initializes a first sensor (e.g., first sensor 208, without limitation) to perform a measurement according to first acquisition process 424, and initializes a second sensor (e.g., second sensor 210, without limitation) to perform a measurement according to second acquisition process 426.

At operation 404, first acquisition process 424 charges a first internal capacitor to a reference voltage Vref. In case of first sensor 208, connections via switches S1, S3 and S4 are OFF, and a connection between Vref and first internal capacitor 212 via switch S2 is ON, and connections between first internal capacitor 212 and both first external capacitor 214 and ground via switch S2 are OFF.

At operation 406, first acquisition process 424 discharges a first external capacitor (i.e., discharges a self-capacitance of an electrode represented by a first external capacitor). In a case of first sensor 208, connections via switches S1 and S3 are OFF, a connection between first external capacitor 214 and ground via switch S4 is ON, the connection between VREF and first internal capacitor 212 via switch S2 is ON, and connections between first internal capacitor 212 and both first external capacitor 214 and ground via switch S2 are OFF. In a case of first sensor 208, operation 404 and operation 406 may be performed at the same time.

At operation 408, first acquisition process 424 couples the first internal capacitor and the first external capacitor. In case of first sensor 208, connections via switches S1, S3, and S4 are OFF, a connection between first internal capacitor 212 and first external capacitor 214 via switch S2 is ON, and connections between first internal capacitor 212 and both Vref and ground via switch S2 are OFF. This arrangement initiates a charge share from first internal capacitor 212 to first external capacitor 214.

Notably, at least partially responsive to performing operations 404, 406, and 408, a voltage level of first voltage V1 is a function of reference voltage Vref, first coupling capacitance $C_{S1}$ of first external capacitor 214, and first internal capacitance $C_{i1}$ of first internal capacitor 212.

At operation 410, first acquisition process 424 measures the first voltage V1 present on the first internal capacitor to obtain a first value. The first value is representative of the voltage level of the first voltage V1. In the case of first sensor 208, a connection between first ADC 202 and first internal capacitor 212 via switch S1 is ON, a connection between first internal capacitor 212 and first external capacitor 214 via switch S2 is ON, connections between first internal capacitor 212 and Vref and ground via switch S2 are OFF, and respective connections of switches S3 and S4 are OFF. First voltage V1 is measured via first ADC 202 to obtain a first value R1.

Turning to second acquisition process 426, at operation 412, second acquisition process 426 discharges a second internal capacitor. In the case of second sensor 210, connections via switches S1, S3 and S4 are OFF, and a connection between ground and second internal capacitor 218 via switch S2 is ON, and connections between second internal capacitor 218 and both second external capacitor 216 and Vref via switch S2 are OFF.

At operation 414, second acquisition process 426 charges second external capacitor to a reference voltage Vref. (i.e., charges a self-capacitance of an electrode represented by a second externa capacitor to reference voltage Vref). In case of second sensor 210, connections via switches S1 and S4 are OFF, a connection between second external capacitor 216 and Vref via switch S3 is ON, the connection between ground and second internal capacitor 218 via switch S2 is ON, and connections between second internal capacitor 218 and both second external capacitor 216 and ground via switch S2 are OFF.

At operation 416, second acquisition process 426 couples the second internal capacitor and the second external capacitor. In case of second sensor 210, connections via switches S1, S3, and S4 are OFF, a connection between second internal capacitor 218 and second external capacitor 216 via switch S2 is ON, and connections between second internal capacitor 218 and both Vref and ground via switch S2 are OFF. This arrangement initiates a charge share from second external capacitor 216 to second internal capacitor 218.

Notably, at least partially responsive to performing operations 412, 414, and 416, a voltage level of second voltage V2 is a function of reference voltage Vref, second coupling capacitance $C_{S2}$ of second external capacitor 216, and second internal capacitance $C_{i2}$ of second internal capacitor 218.

At operation 418, second acquisition process 426 measures the second voltage V2 present on the second internal capacitor to obtain a second value. The second value is representative of a voltage level of second voltage V2. In the case of second sensor 210, a connection between second ADC 204 and second internal capacitor 218 via switch S1 is ON, a connection between second internal capacitor 218 and second external capacitor 216 via switch S2 is ON, connections between second internal capacitor 218 and Vref and ground via switch S2 are OFF, and respective connections of switches S3 and S4 are OFF. Second voltage V2 is measured via second ADC 204 to obtain a second value R2.

At optional operation 420, differential acquisition process 400 may optionally utilize the first sensor 208 to perform another execution of the second acquisition process 426 and utilize the second sensor 210 to perform another execution of the first acquisition process 424. The first and second values obtained from performing first acquisition process 424 and second acquisition process 426 by first sensor 208 may be combined to obtain the first value R1, and the values obtained from performing first acquisition process 424 and second acquisition process 426 by second sensor 210 may be combined to obtain the second value R2.

Figure 6:
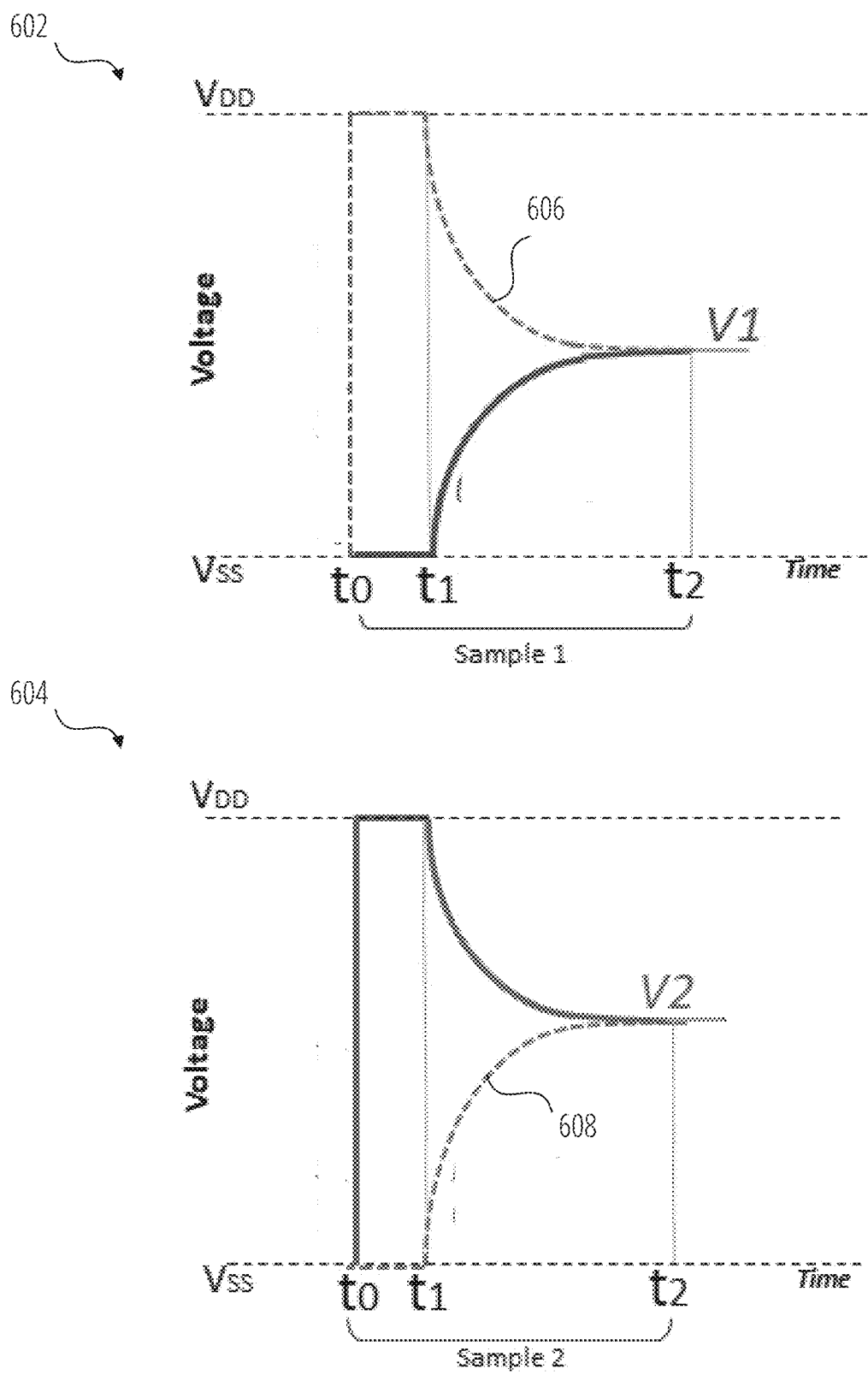
FIG. 6 is a diagram depicting an example voltage levels of first and second voltages during an example execution of a process for generating a differential value performed by a disclosed detector, in accordance with one or more examples.

FIG. 6, to be described further below, depicts voltages generated during a differential acquisition process 400 without optional operation 420, and FIG. 7, to be described further below, depicts voltages generated during a differential acquisition process 400 with optional operation 420.

At operation 422, differential acquisition process 400 calculates a difference between the first value R1 and the second value R2 to obtain a differential value that is indicative of coupling capacitance. The obtained difference is indicative of a difference in first and second coupling capacitances $C_{S1}$ and $C_{S2}$. The difference in self-capacitances is indicative of a distance to a material.

Notably, because first acquisition process 424 and second acquisition process 426, described below, are performed substantially simultaneously, they are influenced by the same noise and coupling errors. Because first and second sensors (e.g., first sensor 208 and second sensor 210, without limitation) are symmetrical, they are influenced to the same degree by that same noise and environmental coupling errors, i.e., substantially the same magnitude of coupling error is present. The net changes in voltage and the directions of charge flow experienced at the first and second sensors while performing first acquisition process 424 and second acquisition process 426 are polar opposites, so the signals are affected by noise and environmental coupling errors in opposite ways, i.e., the respective coupling error that is present have opposite signs. The complimentary (e.g., substantially the same magnitude, but substantially opposite signs) coupling errors are present in the voltages V1 and V2, and captured by the values R1 and R2. When R2 is subtracted from R1, the coupling errors are cancelled and the result is a value with no, or inconsequential, presence of coupling errors that is directly proportional to distance.

Figure 5:
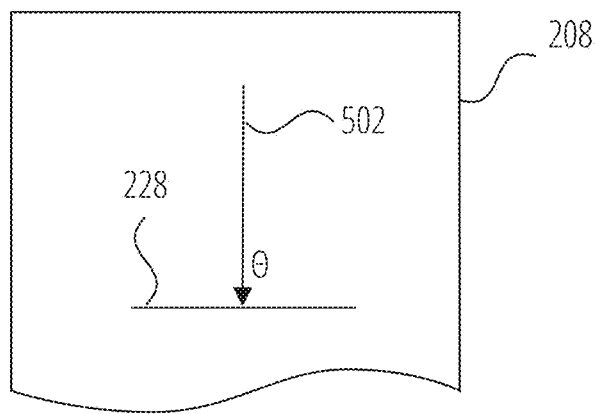
FIG. 5 is a block diagram depicting a first drive signal applied to an electrode of a first sensor and a second drive signal, the timing of which is 180 degrees out of phase with the timing of the first drive signal (θ−180), applied to an electrode of a second sensor, in accordance with one or more examples.
Figure 5:
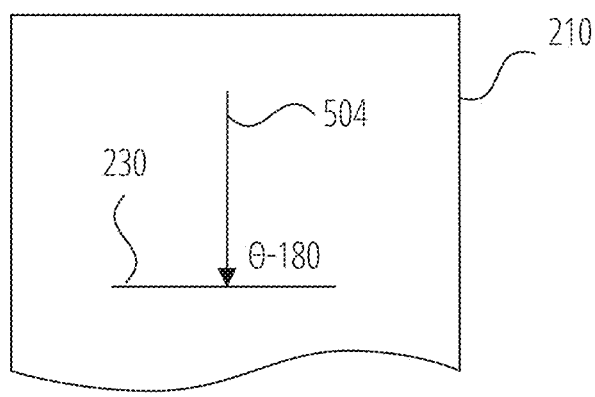

FIG. 5 is a block diagram depicting a first drive signal 502 applied to electrode 228 of first sensor 208 and a second drive signal 504 applied to electrode 230 of second sensor 210, the timing of which second drive signal 504 is 180 degrees out of phase with the timing of first drive signal 502 (θ−180). First drive signal 502 is a non-limiting example of a drive signal applied to electrode 228 during an execution of a first acquisition process 424 and second drive signal 504 is a non-limiting example of a drive signal applied to electrode 230 during an execution of a second acquisition process 426. In one or more examples, first drive signal 502 and second drive signal 504 are applied synchronously.

In optional operation 420, where first sensor 208 performs second acquisition process 426 and second sensor 210 performs first acquisition process 424, the phase of respective drive signals used to generate the measurement signals may remain the same or also change, as long as the respective timings remain 180 degrees out of phase.

FIG. 6 is a diagram depicting example voltage levels of first and second voltages V1 and V2 in first graph 602 and second graph 604, respectively, during an example execution of differential acquisition process 400 performed by detector 200.

At time t0, first internal capacitor 212 of first sensor 208 is charged to Vdd (reference voltage Vref), as shown by the dashed line of first graph 602, and second internal capacitor 218 of second sensor 210 discharged to Vss (ground or system ground), as shown by the dashed line of second graph 604. During time duration from t0 to t1, the first external capacitor 214 is discharged to Vss, as shown by the solid line of first graph 602, and the second external capacitor 216 is charged to Vdd, as shown by the solid line of second graph 604.

At time t1, first internal capacitor 212 and first external capacitor 214 are coupled, and from t1 to time t2 there is a charge share from the first internal capacitor 212 to the first external capacitor 214. This charge share decreases the first voltage V1 to a level, at time t2, indicative of first coupling capacitance $C_{S1}$, as shown by plot 606, with the solid line of first graph 602 showing the voltage across first external capacitor 214. Also at time t1, second internal capacitor 218 and second external capacitor 216 are coupled, and from t1 to time t2 there is a charge share from the second external capacitor 216 to the second internal capacitor 218. This charge share increases the second voltage V2 to a level, at time t2, indicative of second coupling capacitance $C_{S2}$, as shown by plot 608, with the solid line of second graph 604 showing the voltage across second external capacitor 216.

In the case of first sensor 208, plot 606 thus represents an outflow of charge from first internal capacitor 212 to first external capacitor 214 and there is a net negative directional change in the voltage level of first voltage V1 from time t1 to time t0. In the case of second sensor 210, plot 608 represents an inflow of charge from second external capacitor 216 to second internal capacitor 218 and there is a net positive directional change in the voltage level of second voltage V2 from time t1 to time t0.

Figure 7:
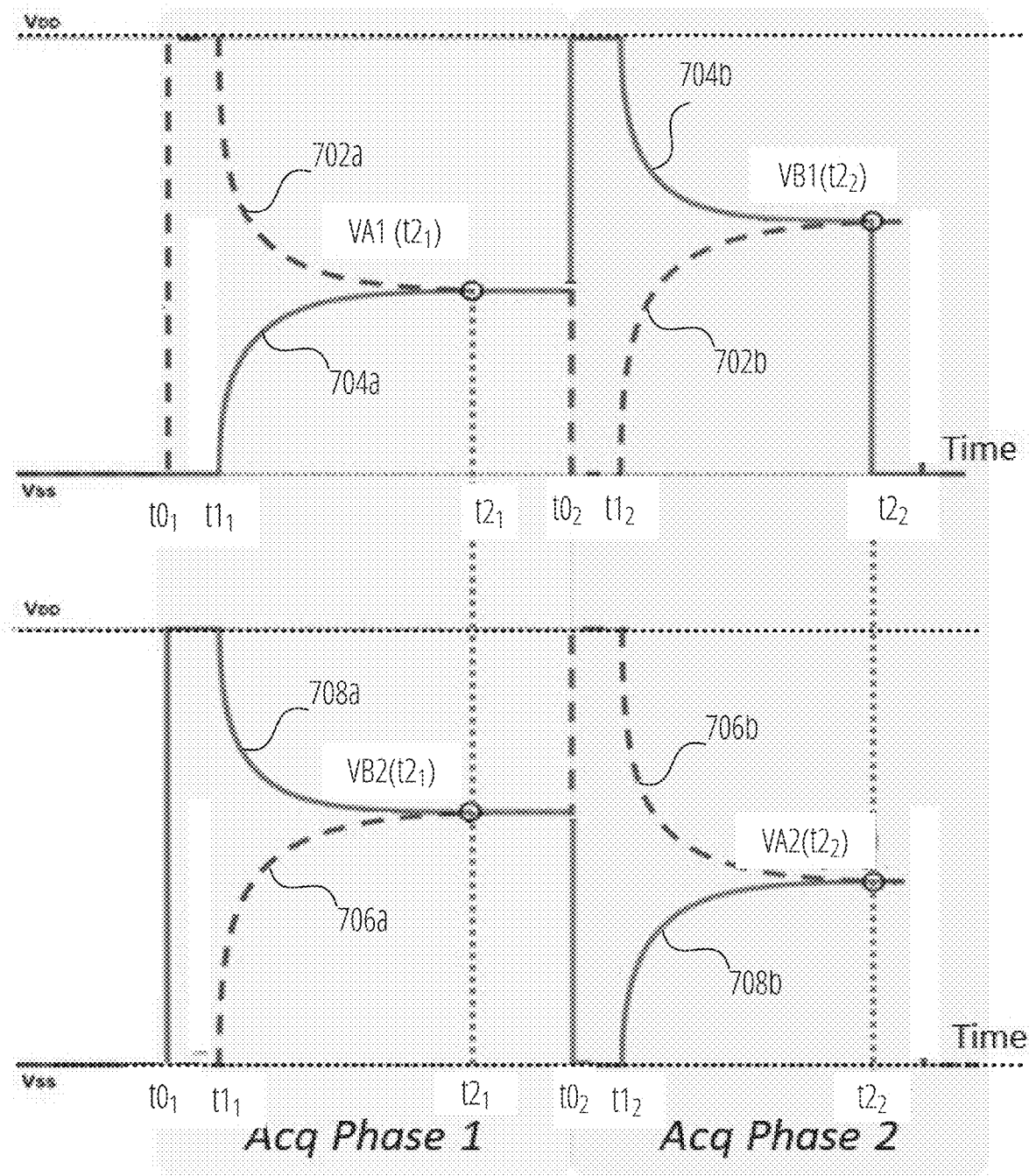
FIG. 7 is a diagram depicting example voltage levels during an example execution of a process for generating a differential value performed by a disclosed detector, in accordance with one or more examples.

FIG. 7 is a diagram depicting example voltage levels during an example execution of differential acquisition process 400 performed by detector 200, including optional operation 420.

FIG. 7 depicts voltage levels at first sensor 208 and second sensor 210 during two acquisition phases, Acq Phase 1 and Acq Phase 2. During Acq Phase 1, first sensor 208 performs first acquisition process 424, as depicted in the upper graph, and second sensor 210 performs second acquisition process 426, as depicted in the lower graph. During Acq Phase 2, first sensor 208 performs second acquisition process 426, as depicted in the upper graph, and second sensor 210 performs first acquisition process 424, as depicted in the lower graph.

A first plot 702a and a first plot 702b represent a voltage level exhibited by voltage V1 (on the internal capacitor) during Acq Phase 1 and Acq Phase 2, respectively. A second plot 704a and a second plot 704b represents a voltage level exhibited by a voltage on an external capacitor during Acq Phase 1 and Acq Phase 2, respectively.

A third plot 706a and third plot 706b represent a voltage level exhibited by voltage V2 during Acq Phase 1 and Acq Phase 2, respectively. A fourth plot 708a and fourth plot 708b represent a voltage level exhibited by an external capacitor during Acq Phase 1 and Acq Phase 2, respectively. At time $t2_1$ during Acq Phase 1, a first value denoted $VA1(t2_1)$ by FIG. 7 is obtained by first sensor 208 and a second value denoted $VB2(t2_1)$ by FIG. 7 is obtained by second sensor 210. At time $t2_2$ during Acq Phase 2, a third value denoted $VB1(t2_2)$ by FIG. 7 is obtained by first sensor 208 and a fourth value denoted $VA2(t2_2)$ by FIG. 7 is obtained by second sensor 210.

First value $VA1(t2_1)$ is obtained at time $t2_1$, and from time $t1_1$ to time $t2_1$, first voltage V1 exhibits a generally decreasing voltage level from VDD toward VSS. Second value $VB1(t2_2)$ is obtained at time $t2_2$, and from time $t1_2$ to time $t2_2$, first voltage V1 exhibits a generally increasing voltage level from VSS toward VDD. When $VA1(t2_1)$ and $VB1(t2_2)$ are combined, the influence of at least some noise on first sensor 208 is cancelled.

Similarly, third value $VB2(t2_1)$ is obtained at time $t2_1$, and from time $t1_1$ to time $t2_1$, first voltage V1 exhibits a generally increasing voltage level from VSS toward VDD. Fourth value $VA2(t2_2)$ is obtained at time $t2_2$, and from time $t1_2$ to time $t2_2$, second voltage V2 exhibits a generally decreasing voltage level from VDD toward VSS. When $VB2(t2_1)$ and $VA2(t2_2)$ are combined, the influence of at least some noise on second sensor 210 is cancelled.

A differential value obtained by at least partially responsive to performing a two phase measurement by each sensor may be expressed as: Differential Value=$VA1(t1_1)$−$VB2(t1_1)$+$VA2(t2_2)$−$VB1(t2_2)$. Additionally or alternatively, in one or more examples, a differential value may be calculated for individual phase measurement and then a two phase measurement result calculated using the individual phase measurement results, the differential value expressed as: value obtained from first phase=$VA1(t1_1)$−$VB2(t1_1)$, and value obtained from second phase=$VA2(t2_2)$−$VB1(t2_2)$, and differential value=$VA1(t1_1)$−$VB2(t1_1)$+$VA2(t2_2)$−$VB1(t2_2)$.

Figure 8:
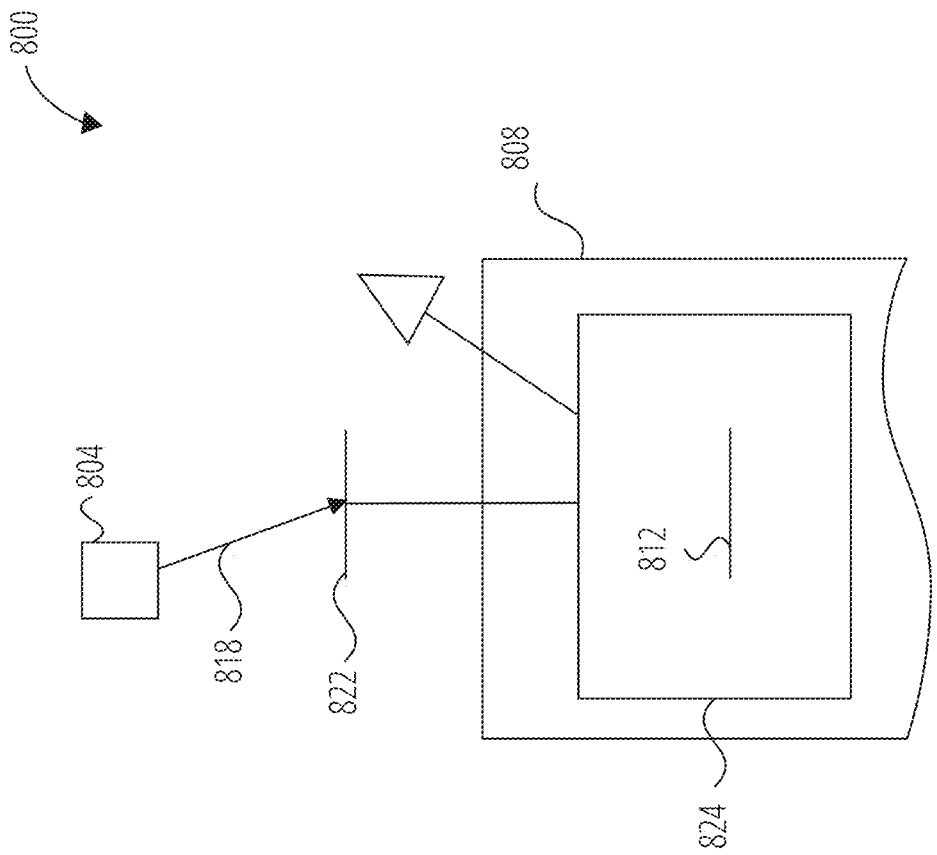
FIG. 8 is a block diagram depicting a detector portion configured to apply guard voltages that increase immunity from leakage currents at respective electrodes of sensors, in accordance with one or more examples.
Figure 8:
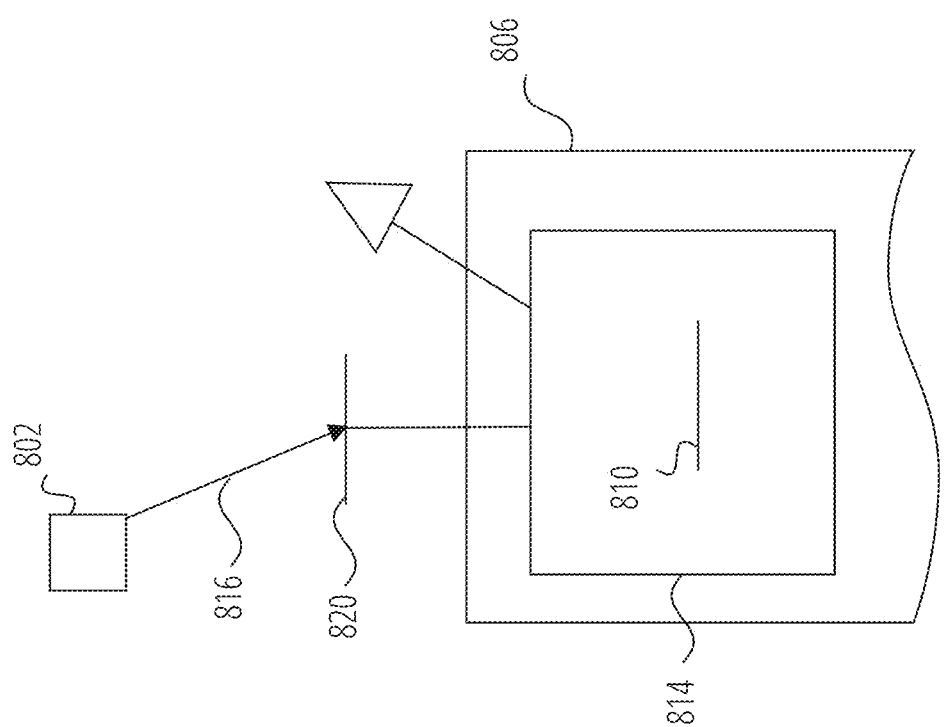

FIG. 8 is a block diagram depicting a detector portion 800 configured to apply guard voltages (i.e., called a driven shield) that increase immunity from leakage currents at respective electrodes of first and second sensors, such as electrode 228 of first sensor 208 and electrode 230 of second sensor 210, without limitation.

A first guard wire 814 is arranged on first support structure portion 806 (e.g., a portion of a printed circuit board (PCB), without limitation) on a path that surrounds electrode 810 arranged on first support structure portion 806. Similarly, a second guard wire 824 is arranged on a second support structure portion 808 (which may be the same or a different support structure from first support structure portion 806) on a path that surrounds electrode 812. A first driven guard electrode 820 coupled to first guard wire 814 is provided for receiving a first guard voltage 816 generated by first guard circuit 802, and a second driven guard electrode 822 coupled to second guard wire 824 is provided for receiving second guard voltage 818 generated by second guard circuit 804.

In one or more examples, the respective waveforms of first guard voltage 816 and second guard voltage 818 may track the waveforms of a voltage at first external capacitor 214 and second external capacitor 216. However, 1 to 1 correspondence of the waveforms is not required, as long as the total net change in voltage level exhibited by first guard voltage 816 and second guard voltage 818 is the same as the total net change in voltage level exhibited by voltages across first external capacitor 214 and second external capacitor 216, respectively, during a time duration of interest. In one or more examples, first guard circuit 802 and second guard circuit 804 may be configured with information about a net voltage change and timing, to generate first and second guard voltages 816 and 818, respectively, exhibiting suitable voltage levels for guarding.

Figure 9:
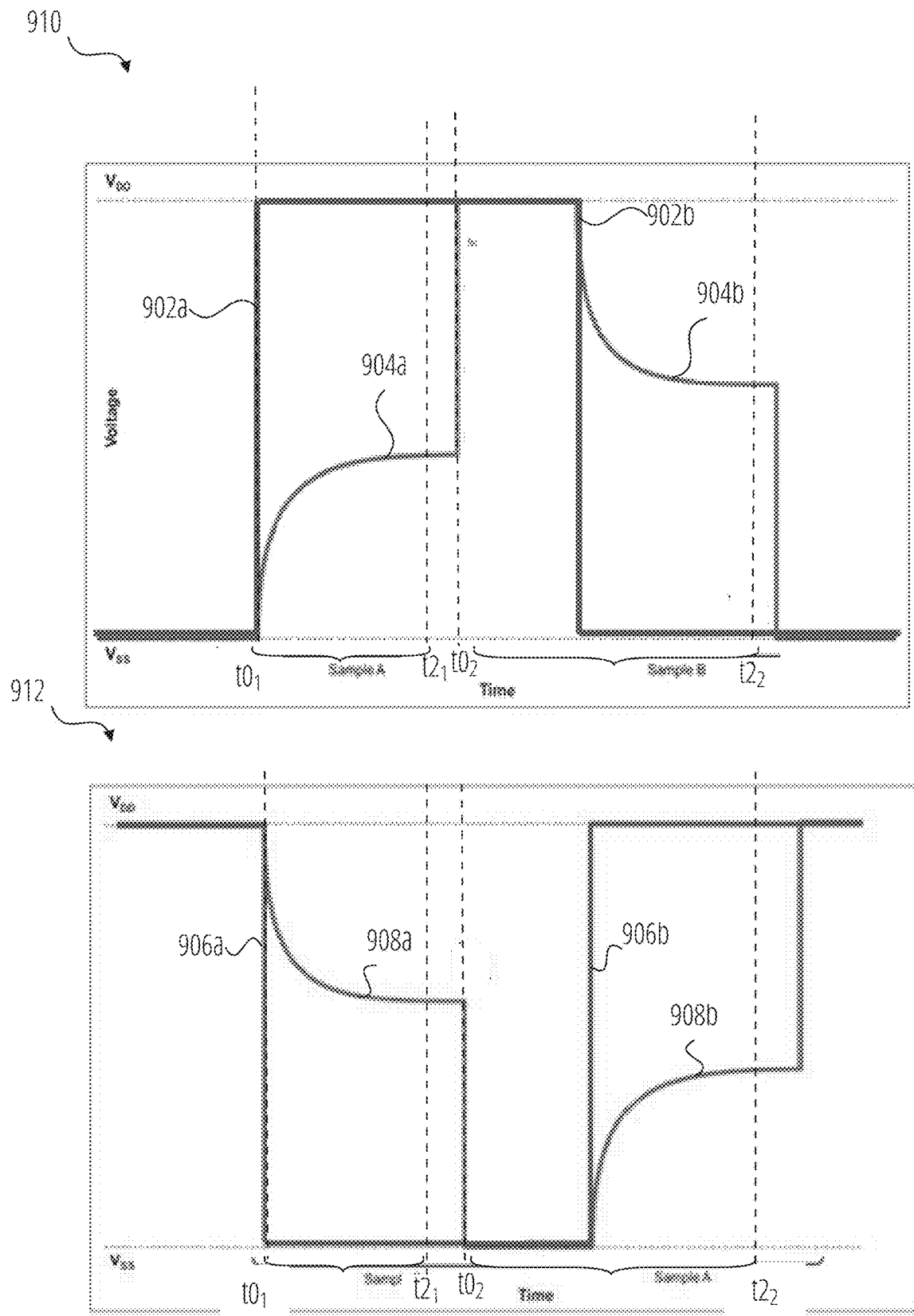
FIG. 9 depicts diagrammatic views of example voltage levels during first and second acquisition phases, in accordance with one or more examples.

FIG. 9 depicts diagrammatic views of example voltage levels during first and second acquisition phases of an example differential acquisition process 400 that includes optional operation 420, and the guard voltages of FIG. 8.

First diagrammatic view 910 depicts voltage levels exhibited at electrode 810 and first guard voltage 816 during first and second acquisition phases of an example differential acquisition process 400. Second diagrammatic view 912 depicts voltage levels exhibited by second guard voltage 818 and electrode 812 during first and second acquisition phases of the example differential acquisition process 400.

The first acquisition phase is from times $t0_1$ to $t2_1$, and the second acquisition phase is from times $t0_2$ to $t2_2$. Labels for times $t1_1$ and $t1_2$ depicted in FIG. 6 and FIG. 7 to mark the beginning of charge sharing between internal capacitors and external capacitors are not depicted by FIG. 9 to avoid unnecessarily obscuring the drawing and the description thereof.

In first diagrammatic view 910, first plot 902a represents the voltage levels exhibited by first guard voltage 816 during the first acquisition phase, and first plot 902b represents the voltage levels exhibited by first guard voltage 816 during the second acquisition phase. Second plot 904a represents the voltage levels exhibited by the electrode 810 during the first acquisition phase, and second plot 904b represents the voltage levels exhibited by the electrode 810 during the second acquisition phase.

In second diagrammatic view 912, third plot 906a represents the voltage level of second guard voltage 818 during the first acquisition phase, and third plot 906b represents the voltage level of second guard voltage 818 during the second acquisition phase. Fourth plot 908a represents the voltage levels exhibited by electrode 812 during the first acquisition phase, and fourth plot 908b represents the voltage levels exhibited by electrode 812 during the second acquisition phase.

The net change in voltage level, and polarity of such change, exhibited by electrode 810 and first guard voltage 816 depicted by second plot 904a and first plot 902a from time $t0_1$ to time $t2_1$ is the same, a net change of VSS to VDD. The net change in voltage level, and polarity of such change, exhibited by electrode 810 and first guard voltage 816 depicted by second plot 904b and first plot 902b from time $t0_2$ to just after time $t2_2$ is the same, a net change of VDD to VSS. The net change in voltage level, and polarity of such change, exhibited by electrode 812 and second guard voltage 818 depicted by fourth plot 908a and third plot 906a from time $t0_1$ to time $t2_1$ is the same, a net change of VDD to VSS. The net change in voltage level, and polarity of such change, exhibited by electrode 812 and second guard voltage 818 depicted by fourth plot 908b and third plot 906b from time $t0_2$ to just after time $t2_2$ is the same, a net change of VSS to VDD.

Notably, second plot 904b drops to VSS and fourth plot rises to VDD just after $t2_2$. This may reflect a discharge of a first external capacitor or charge of a second external capacitor optionally as part of operation 412 or operation 404 of an optional new execution of second acquisition process 426 or first acquisition process 424, respectively. It may optionally reflect a driving of electrode 810 to VS S or electrode 812 to VDD so the net changes in voltage level are the same as guard voltages 816 and 818.

The presence of first guard voltage 816 and second guard voltage 818 exhibiting voltage levels that track the net change, and polarity of such change, of voltage levels exhibited by electrode 810 and electrode 812 immunizes electrode 810 and electrode 812 from flows of leakage current.

Figure 10:
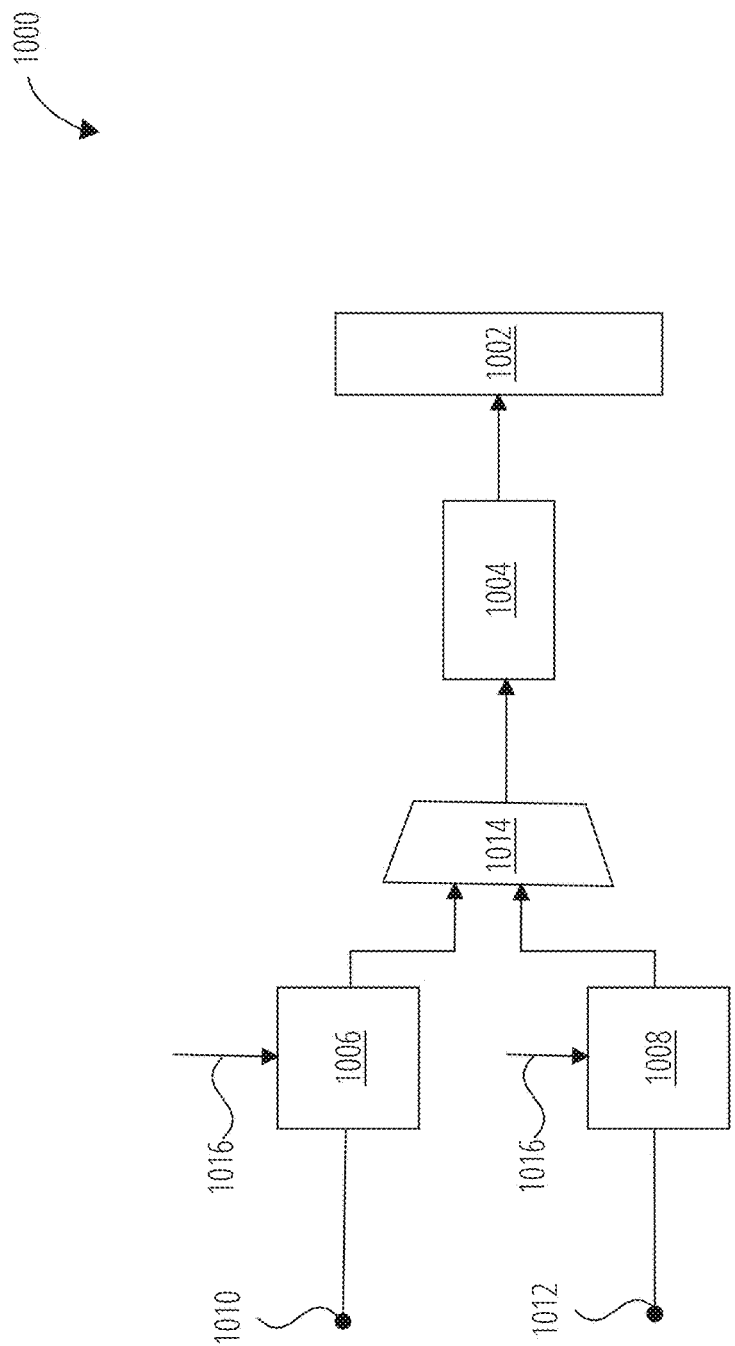
FIG. 10 is a block diagram depicting a measurement circuit that may be utilized, as a non-limiting example, to implement a first measurement circuit and a second measurement circuit with a single ADC, in accordance with one or more examples.

FIG. 10 is a block diagram depicting a measurement circuit 1000 that may be utilized, as a non-limiting example, to implement first measurement circuit 226 and second measurement circuit 226 with a single ADC 1004. Measurement circuit 1000 includes a first sample and hold circuit 1006 and a second sample and hold circuit 1008, respectively configured to samples the voltage of a continuously varying analog signal and hold its value at a constant level for a specified time duration. In one or more examples, respective inputs of first sample and hold circuit 1006 and second sample and hold circuit 1008 may be coupled to sense lines of different sensors via first terminal 1010 and second terminal 1012, such as first sense line 236 of first sensor 208 and second sense line 238 of second sensor 210, without limitation. In one or more examples, first sample and hold circuit 1006 and second sample and hold circuit 1008 are configured to perform respective voltage sampling responsive to a timing signal 1016. In one or more examples, first sample and hold circuit 1006 and second sample and hold circuit 1008 utilize the same timing signal 1016 (or two well synchronized timing signals) so that they may be controlled to perform their respective voltage sampling at substantially the same time.

Measurement circuit 1000 includes a multiplexer 1014 arranged to selectively provide one of the output of first sample and hold circuit 1006 and second sample and hold circuit 1008 to an input of ADC 1004. ADC 1004 is configured to digitize the respective voltage levels provided by multiplexer 1014 and store the values at a buffer 1002. The digitized values are stored at buffer 1002, available for a processor (such as processor 206, without limitation) to retrieve and combine to obtain a differential value indicative of coupling capacitance. While ADC 1004 measures voltages provided by the respective inputs to multiplexer 1014 at different times, the voltages exhibit the voltage levels of voltages sampled at substantially the same time, and so include complimentary coupling errors, as discussed herein.

Figure 11:
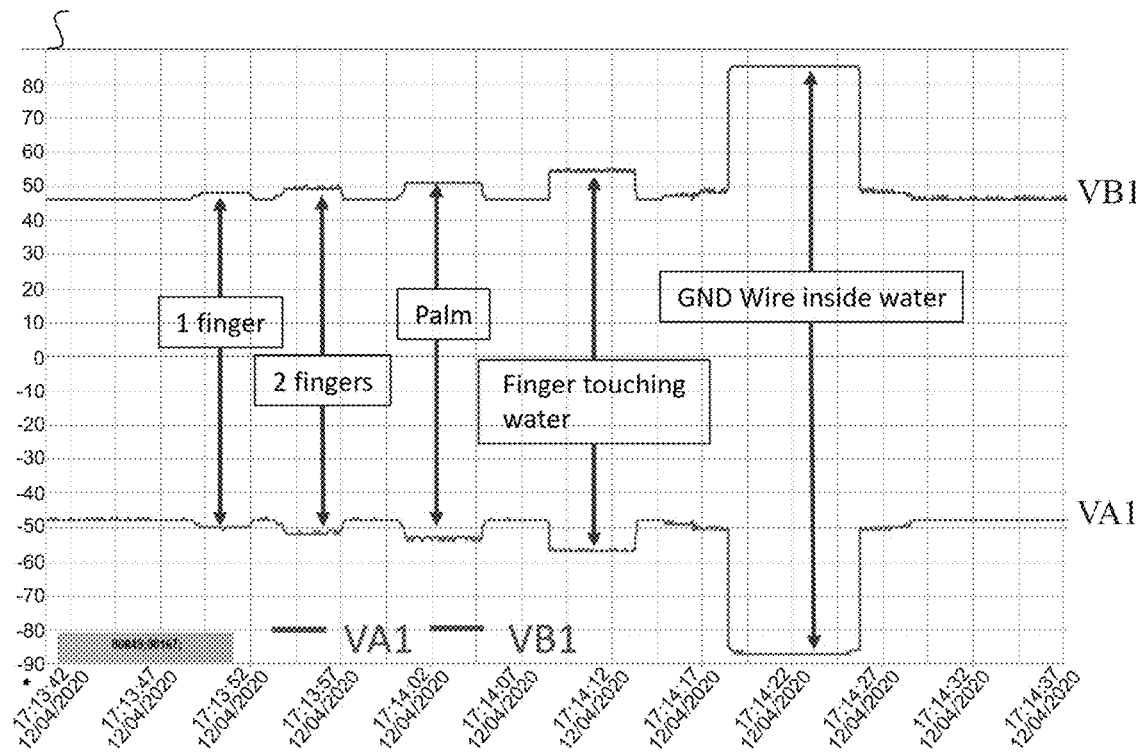
FIG. 11 is a diagram depicting self-capacitance indications and coupling capacitance indications in example operations, in accordance with one or more examples.
Figure 11:
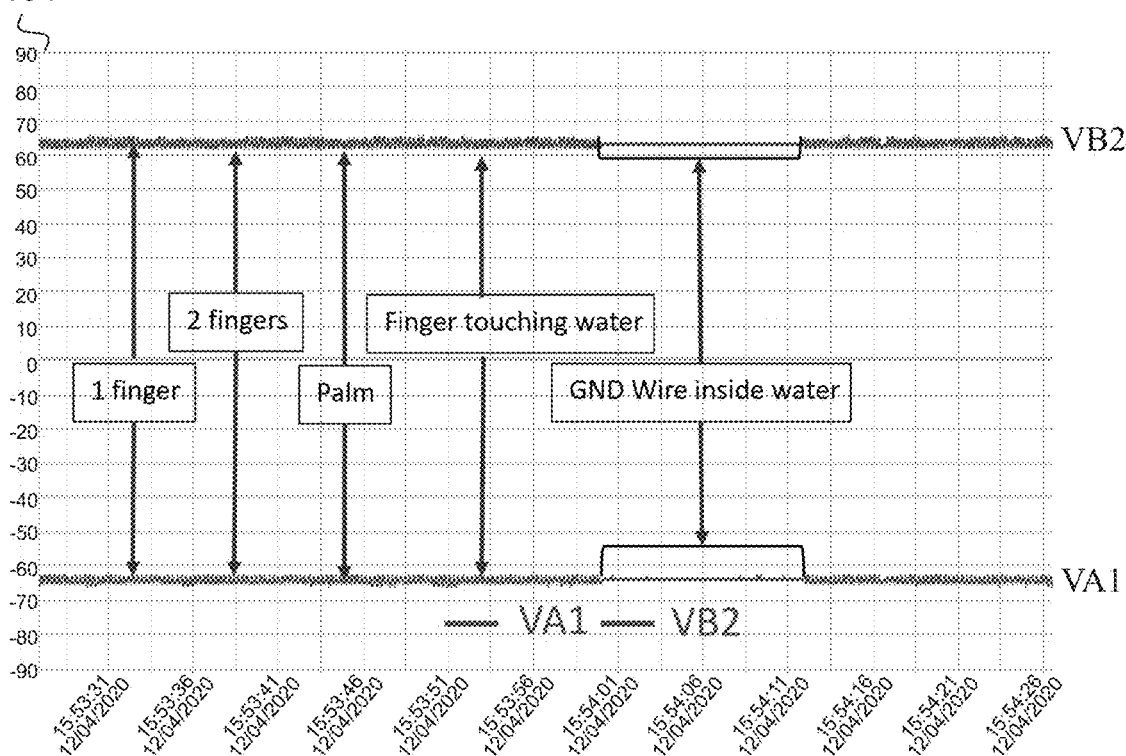

FIG. 11 is a diagram including a first diagrammatic view 1102 and a second diagrammatic view 1104 that depict value indications for vertical elevation utilizing self-capacitance indications (e.g., self-capacitance indications 124 of FIG. 1A, without limitation) and differential values (e.g., differential value 106 of FIG. 1A or 220 of FIG. 2, without limitation), respectively, during several events. As can be seen by comparing the respective values depicted by views 1102 and 1104 during the events (DUT wall touched by 1 finger, 2 finger, palm of hand; water present at DUT touched by finger; and ground wire inserted to water), the value indications for vertical elevation in view 1102 vary considerably in response to the events, including when a ground wire is inserted into the water, which results in a large change as compared to the value indications for times when there were no events. In second diagrammatic view 1104, the value indications for vertical elevation do not exhibit substantial change for a majority of the events, and when the ground wire was inserted into the water, a modest changed is observed, as compared to first diagrammatic view 1102.

First diagrammatic view 1102 thus depicts values of self-capacitance indications influenced by DUT wall touched by 1 finger, 2 finger, palm of hand; water present at DUT touched by finger; and ground wire inserted to water, respectively, that results in the presence of coupling errors in the values. The presence of coupling errors caused large fluctuations in the values. Utilizing differential values, as seen in second diagrammatic view 1104 provides for reduced influence on self-capacitance indications.

Any characterization in this description of something as "typical," "conventional," "known," or the like does not necessarily mean that it is disclosed in the prior art or that the discussed aspects are appreciated in the prior art. Nor does it necessarily mean that, in the relevant field, it is widely known, well-understood, or routinely used. It only means that it is known to or appreciated by the inventors of this disclosure.

As used in the present disclosure, the term "combination" with reference to a plurality of elements may include a combination of all the elements or any of various different sub combinations of some of the elements. For example, the phrase "A, B, C, D, or combinations thereof" may refer to any one of A, B, C, or D; the combination of each of A, B, C, and D; and any sub combination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims, without limitation) are generally intended as "open" terms (e.g., the term "including" should be interpreted as "including, but not limited to," the term "having" should be interpreted as "having at least," the term "includes" should be interpreted as "includes, but is not limited to," without limitation). As used herein, the term "each" means some or a totality. As used herein, the term "each and every" means a totality.

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more," without limitation); the same holds true for the use of definite articles used to introduce claim recitations. As used herein, the term "each" means some or a totality, and the term "each and every" means a totality.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations, without limitation). Furthermore, in those instances where a convention analogous to "at least one of A, B, and C, without limitation" or "one or more of A, B, and C, without limitation" is used, in general such a construction is intended to include A alone, B alone, C alone, A and B together, A and C together, B and C together, or A, B, and C together, without limitation.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Various examples of non-limiting examples of the disclosure include:

Example 1

An apparatus, comprising: a detector, wherein a signal that the detector is configured to sense is a differential value that is indicative of a difference in self-capacitance indications that are exhibited at first and second internal capacitors, wherein the differential value is proportional to a vertical elevation of a surface of a material present at a device-under-test coupled to electrodes of the detector.

Example 2

The apparatus according to Example 1, comprising: a first sensor configured to generate a first voltage indicative of a first self-capacitance of a respective electrode; and a second sensor configured to generate a second voltage indicative of a second self-capacitance of a respective electrode.

Example 3

The apparatus according to any of Examples 1 and 2, wherein: the first sensor is configured to change a voltage level of the first voltage at least partially responsive to changes in the first self-capacitance; and the second sensor is configured to change a voltage level of the second voltage at least partially responsive to changes in the second self-capacitance.

Example 4

The apparatus according to any of Examples 1 through 3, wherein the first sensor and the second sensor are configured to provide substantially symmetrical responses to capacitive coupling with the material present at the device-under-test.

Example 5

The apparatus according to any of Examples 1 through 4, wherein the first sensor and the second sensor are configured to provide a substantially symmetrical response to coupling variations between the material present at the device-under-test and the first sensor and the second sensor.

Example 6

The apparatus according to any of Examples 1 through 5, wherein the substantially symmetrical response the first sensor and the second sensor are configured to provide comprise: responses to coupling variations between the material present at the device-under-test and the first sensor and the second sensor is at least partially responsive to a change in a dielectric property of the material.

Example 7

The apparatus according to any of Examples 1 through 6, wherein: the first sensor comprises: a first acquisition circuit, the first acquisition circuit configured to generate the first voltage at the first internal capacitor; and a first measurement circuit, the first measurement circuit configured to generate a first value, the first value indicative of a voltage level exhibited by the first voltage, and the second sensor comprises: a second acquisition circuit, the second acquisition circuit configured to generate the second voltage at the second internal capacitor; and a second measurement circuit, the second measurement circuit configured to generate a second value, the second value indicative of a voltage level exhibited by the second voltage.

Example 8

The apparatus according to any of Examples 1 through 7, wherein: the first measurement circuit comprises a first analog-to-digital converter arranged to measure the first voltage generated at the first internal capacitor; and the second measurement circuit comprises a second analog-to-digital converter arranged to measure the second voltage generated at the second internal capacitor.

Example 9

The apparatus according to any of Examples 1 through 8, comprising: a sample-and-hold circuit; an analog-to-digital converter; and a processor configured to control the sample-and-hold circuit and the analog-to-digital converter to alternately measure the first voltage generated at the first internal capacitor and the second voltage generated at the second internal capacitor.

Example 10

The apparatus according to any of Examples 1 through 9, comprising: a first wire arranged around the respective electrode of the first sensor; a second wire arranged around the respective electrode of the second sensor; and a first driven guard electrode electrically coupled to the first wire and configured to receive a first guard voltage; and a second driven guard electrode electrically coupled to the second wire, the second driven guard electrode configured to receive a second guard voltage.

Example 11

A method, comprising: obtaining a differential value that is indicative of a difference in self-capacitance indications for electrodes, the self-capacitance indications being exhibited at first and second internal capacitors; and inferring a vertical elevation of a surface of a material present at a device-under-test coupled to the electrodes at least partially responsive to the differential value.

Example 12

The method according to Example 11, comprising: performing a first acquisition process to obtain a first self-capacitance indication for a first one of the electrodes; and performing a second acquisition process to obtain a second self-capacitance indication for a second one of the electrodes.

Example 13

The method according to any of Examples 11 and 12, wherein performing the first acquisition process comprises: charging a first internal capacitor to a reference voltage; discharging a first external capacitor, the first external capacitor associated with the first one of the electrodes; coupling the first internal capacitor and the first external capacitor; and measuring a voltage exhibited by the first internal capacitor.

Example 14

The method according to any of Examples 11 through 13, wherein performing the second acquisition process comprises: discharging a second internal capacitor; charging a second external capacitor to reference voltage the second external capacitor associated with the second one of the electrodes; coupling the second internal capacitor and the second external capacitor; and measuring a voltage exhibited by the second internal capacitor.

Example 15

The method according to any of Examples 11 through 14, wherein performing the first acquisition process and the second acquisition process comprises: performing the first acquisition process utilizing a first sensor and performing the second acquisition process utilizing a second sensor; and performing the second acquisition process utilizing the first sensor and performing the first acquisition process utilizing the second sensor.

Example 16

The method according to any of Examples 11 through 15, wherein the first acquisition process and the second acquisition process are performed substantially simultaneously.

Example 17

The method according to any of Examples 11 through 16, wherein the first and second self-capacitance indications are generated substantially simultaneously.

Example 18

An apparatus, comprising: a detector, wherein a signal that the detector is configured to sense is a differential value that is an indication of a coupling capacitance of exhibited by two respective electrodes, wherein the indication of the coupling capacitance is proportional to a relationship between a first material and a second material present at a device-under-test coupled to the two respective electrodes of the detector.

Example 19

An apparatus, comprising: a detector, wherein a signal the detector is configured to sense is a variation in self-capacitance of an electrode that includes only variations in self-capacitance due to variation in capacitive coupling between an electrode and a material-of-interest.

Example 20

An apparatus, comprising: a detector, wherein a signal the detector is configured to sense is a variation in self-capacitance of an electrode that includes only variations in self-capacitance due to a change in a dielectric property of a material-of-interest.

The features of the various examples described herein are not mutually exclusive and can exist in various combinations and permutations, even if such combinations or permutations are not expressly described herein, without departing from the scope of the disclosure. In fact, variations, modifications, and other implementations of what is described herein will occur to one of ordinary skill in the art without departing from the scope of the disclosure. As such, the invention is not to be defined only by the preceding illustrative description, but only by the claims which follow, and legal equivalents thereof

What is claimed is:
1. An apparatus, comprising:
a detector, wherein a signal that the detector is configured to sense is a differential value indicative of a difference in self-capacitance indications exhibited at first and second internal capacitors, wherein the differential value is proportional to a vertical elevation of a surface of a material present at a device-under-test coupled to electrodes of the detector.

2. The apparatus of claim 1, comprising:
a first sensor to generate a first voltage indicative of a first self-capacitance of a respective electrode; and
a second sensor to generate a second voltage indicative of a second self-capacitance of a respective electrode.

3. The apparatus of claim 2, wherein:
the first sensor is to change a voltage level of the first voltage at least partially responsive to changes in the first self-capacitance; and
the second sensor is to change a voltage level of the second voltage at least partially responsive to changes in the second self-capacitance.

4. The apparatus of claim 2, wherein the first sensor and the second sensor are to provide substantially symmetrical responses to capacitive coupling with the material present at the device-under-test.

5. The apparatus of claim 2, wherein the first sensor and the second sensor are to provide a substantially symmetrical response to coupling variations between the material present at the device-under-test and the first sensor and the second sensor.

6. The apparatus of claim 5, wherein the substantially symmetrical response the first sensor and the second sensor are to provide comprise: responses to coupling variations between the material present at the device-under-test and the first sensor and the second sensor is at least partially responsive to a change in a dielectric property of the material.

7. An apparatus, comprising:
a detector, wherein a signal that the detector is configured to sense is a differential value indicative of a difference in self-capacitance indications exhibited at first and second internal capacitors, wherein the differential value is proportional to a vertical elevation of a surface of a material present at a device-under-test coupled to electrodes of the detector,
wherein a first sensor is to change a voltage level of a first voltage at least partially responsive to changes in a first self-capacitance, wherein the first sensor comprises:
a first acquisition circuit, the first acquisition circuit to generate the first voltage at the first internal capacitor; and
a first measurement circuit, the first measurement circuit to generate a first value, the first value indicative of a voltage level exhibited by the first voltage, and
wherein a second sensor is to change a voltage level of a second voltage at least partially responsive to changes in a second self-capacitance, wherein the second sensor comprises:
a second acquisition circuit, the second acquisition circuit to generate the second voltage at the second internal capacitor; and
a second measurement circuit, the second measurement circuit to generate a second value, the second value indicative of a voltage level exhibited by the second voltage.

8. The apparatus of claim 7, wherein:
the first measurement circuit comprises a first analog-to-digital converter arranged to measure the first voltage generated at the first internal capacitor; and
the second measurement circuit comprises a second analog-to-digital converter arranged to measure the second voltage generated at the second internal capacitor.

9. The apparatus of claim 2, comprising:
a sample-and-hold circuit;
an analog-to-digital converter; and
a processor to control the sample-and-hold circuit and the analog-to-digital converter to alternately measure the first voltage generated at the first internal capacitor and the second voltage generated at the second internal capacitor.

10. The apparatus of claim 2, comprising:
a first wire arranged around the respective electrode of the first sensor;
a second wire arranged around the respective electrode of the second sensor; and
a first driven guard electrode electrically coupled to the first wire, the first driven guard electrode to receive a first guard voltage; and
a second driven guard electrode electrically coupled to the second wire, the second driven guard electrode to receive a second guard voltage.

11. A method, comprising:
obtaining a differential value that is indicative of a difference in self-capacitance indications for electrodes, the self-capacitance indications being exhibited at first and second internal capacitors; and
inferring a vertical elevation of a surface of a material present at a device-under-test coupled to the electrodes at least partially responsive to the differential value.

12. A method, comprising:
performing a first acquisition process to obtain a first self-capacitance indication for a first electrode;
performing a second acquisition process to obtain a second self-capacitance indication for a second electrode;
obtaining a differential value that is indicative of a difference between the first self-capacitance indication and the second self-capacitance indication, the self-capacitance indications being exhibited at first and second internal capacitors; and
inferring a vertical elevation of a surface of a material present at a device-under-test coupled to the electrodes at least partially responsive to the differential value.

13. The method of claim 12, wherein performing the first acquisition process comprises:
charging a first internal capacitor to a reference voltage;
discharging a first external capacitor, the first external capacitor associated with the first electrode;
coupling the first internal capacitor and the first external capacitor; and
measuring a voltage exhibited by the first internal capacitor.

14. The method of claim 12, wherein performing the second acquisition process comprises:
discharging a second internal capacitor;
charging a second external capacitor to reference voltage the second external capacitor associated with the second electrode;
coupling the second internal capacitor and the second external capacitor; and
measuring a voltage exhibited by the second internal capacitor.

15. The method of claim 12, wherein performing the first acquisition process and the second acquisition process comprises:

performing the first acquisition process utilizing a first sensor and performing the second acquisition process utilizing a second sensor; and performing the second acquisition process utilizing the first sensor and performing the first acquisition process utilizing the second sensor.

16. The method of claim 12, wherein the first acquisition process and the second acquisition process are performed substantially simultaneously.

17. The method of claim 12, wherein the first and second self-capacitance indications are generated substantially simultaneously.

18. The apparatus of claim 1, wherein the differential value indicative of the difference in self-capacitance indications exhibited at first and second internal capacitors at least partially responsive to a same measurement.

19. The method of claim 12, comprising:

performing the first acquisition process and performing the second acquisition process during a same measurement.

\* \* \* \* \*